United States Patent
Li et al.

(10) Patent No.: US 11,382,024 B2
(45) Date of Patent: Jul. 5, 2022

(54) METHOD FOR TRANSMITTING SYSTEM INFORMATION, APPARATUS, AND SYSTEM

(71) Applicant: HUAWEI TECHNOLOGIES CO., LTD., Guangdong (CN)

(72) Inventors: Zhenyu Li, Beijing (CN); Jinxia Han, Beijing (CN); Wurong Zhang, Shenzhen (CN); Yang Nan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 16/925,709

(22) Filed: Jul. 10, 2020

(65) Prior Publication Data

US 2020/0344673 A1 Oct. 29, 2020

Related U.S. Application Data

(63) Continuation of application No. PCT/CN2018/072187, filed on Jan. 11, 2018.

(51) Int. Cl.
*H04W 48/12* (2009.01)
*H04L 1/18* (2006.01)
(Continued)

(52) U.S. Cl.
CPC .......... *H04W 48/12* (2013.01); *H04L 1/1819* (2013.01); *H04W 16/14* (2013.01); *H04W 72/04* (2013.01)

(58) Field of Classification Search
CPC ..... H04W 48/12; H04W 16/14; H04W 72/04; H04L 1/1819
See application file for complete search history.

(56) References Cited

U.S. PATENT DOCUMENTS

2008/0182577 A1 7/2008 Ng et al.
2015/0365880 A1* 12/2015 Malladi ................. H04W 48/10
　　　　　　　　　　　　　　　　　　　　370/312
2016/0316491 A1 10/2016 Axmon et al.

FOREIGN PATENT DOCUMENTS

CN 　　101562901 A 　　10/2009
CN 　　101729139 A 　　6/2010
(Continued)

OTHER PUBLICATIONS

Ericsson, "emtc-u SI scheduling follow-up," Telco follow-up, Jan. 10, 2018, 12 pages.
(Continued)

*Primary Examiner* — Shukri Taha
(74) *Attorney, Agent, or Firm* — Fish & Richardson P.C.

(57) ABSTRACT

Embodiments of the present invention relate to the field of communications technologies and provide a method for transmitting system information, an apparatus, and a system, to reduce a delay in obtaining correct system information by a terminal device. One method includes: generating a system information block SIB, and sending the SIB in N time units of a SIB period, wherein a first time unit of the N time units includes a redundancy version number of the SIB that is set to 0, the SIB period comprises T time unit groups, and the T time unit groups comprise $T_P$ SIB candidate sending time unit groups, wherein $T_P \le T$, each of the T time unit groups comprises A time units for a clear channel assessment (CCA), and each of the $T_P$ SIB candidate sending time unit groups comprises r SIB candidate sending time units, and wherein N is a total quantity of SIB candidate sending time units comprised in one or more of the $T_P$ SIB candidate sending time unit groups that the CCA is successful, and $N \le T_P \times r$.

20 Claims, 11 Drawing Sheets

(51) Int. Cl.
*H04W 16/14* (2009.01)
*H04W 72/04* (2009.01)

(56) References Cited

FOREIGN PATENT DOCUMENTS

| | | |
|---|---|---|
| CN | 106465430 A | 2/2017 |
| CN | 107534992 A | 1/2018 |
| WO | 2017127181 A1 | 7/2017 |

OTHER PUBLICATIONS

Ericsson, "Open issues on SI scheduling for MFA TS 36.321," MFA TSG# 14.1 mf2018.029.01, Telco follow-up, Jan. 29, 2018, 3 pages.
3GPP TS 36.133 V15.0.0 (Sep. 2017),"3rd Generation Partnership Project; Technical Specification Group Radio Access Network; Evolved Universal Terrestrial Radio Access (E-UTRA); Requirements for support of radio resource management (Release 15)," Sep. 2017, 2663 pages.
3GPP TS 36.300 V15.0.0 (Dec. 2017), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 15);Total 338 Pages.
3GPP TS 36.331 V15.0.1 (Jan. 2018), "3rd Generation Partnership Project;Technical Specification Group Radio Access Network; Evolved Universal Terrestrial Radio Access (E-UTRA); Radio Resource Control (RRC); Protocol specification (Release 15)," Jan. 2018, 776 pages.
Extended European Search Report issued in European Application No. 18899464.4 dated Oct. 19, 2020, 8 pages.
PCT International Search Report and Written Opinion issued in International Application No. PCT/CN2018/072187 dated Jun. 27, 2018, 15 pages (with English translation).

* cited by examiner

CCA     Downlink     Uplink

METHOD FOR TRANSMITTING SYSTEM INFORMATION, APPARATUS, AND SYSTEM

CROSS-REFERENCE TO RELATED APPLICATIONS

This application is a continuation of International Application No. PCT/CN2018/072187, filed on Jan. 11, 2018, the disclosure of which is hereby incorporated by reference in its entirety.

TECHNICAL FIELD

Embodiments of the present invention relate to the field of communication technologies, and in particular, to a method for transmitting system information, a device, and a system.

BACKGROUND

In the field of communications technologies, after an access network device determines a redundancy version number of system information, the access network device may send, to user equipment (user equipment, UE), the system information corresponding to the redundancy version number.

Using an example in which the access network device sends a system information block (system information block, SIB) to the UE, usually, the access network device may periodically send the SIB to the UE, and may send, to the UE for a plurality of times in one period, a SIB corresponding to a redundancy version number. The redundancy version number may indicate a start location of the SIB. Specifically, the access network device first performs channel assessment in each clear channel assessment (clear channel assessment, CCA) period (for example, 80 ms), determines the redundancy version number of the SIB when the assessed channel is idle, and then sends, on the clear channel, the SIB corresponding to the redundancy version number to the UE. It is assumed that a period (referred to as a SIB period below) in which the access network device sends a SIB to the UE is 320 ms, a subframe group of the access network device is 80 ms, and a quantity of times for which the access network device sends a SIB to the UE in one SIB period is 4. In this case, the access network device sends a SIB to the UE once in each subframe group, the access network device determines, based on system frame numbers and a repetition quantity of the SIB, redundancy version numbers of the SIB that correspond to the different system frame numbers. Specifically, redundancy version numbers of the SIB that respectively correspond to the SIB in four times of sending performed by the access network device in one SIB period and that are determined by the access network device are (0, 2, 3, 1). To be specific, the access network device sends, to the UE for the first time (that is, in the first subframe group), the SIB corresponding to a redundancy version number 0, the access network device sends, to the UE for the second time (that is, in the second subframe group), the SIB corresponding to a redundancy version number 2, the access network device sends, to the UE for the third time (that is, in the third subframe group), the SIB corresponding to a redundancy version number 3, and the access network device sends, to the UE for the fourth time (that is, in the fourth subframe group), the SIB corresponding to a redundancy version number 1. The SIB corresponding to the redundancy version number 0 includes a relatively large quantity of information bits, so that a correct rate of decoding the SIB by the UE can be improved.

However, in the foregoing method, if the access network device fails to perform the first CCA in one SIB period, the access network device cannot send, to the UE on a downlink channel corresponding to the subframe group, the SIB having the redundancy version number of 0. After the access network device successfully performs a next CCA, the access network device sends, to the UE, the SIB corresponding to a next redundancy version number (namely, the redundancy version number 2) of the redundancy version number 0. Consequently, the UE cannot receive, in the SIB period, the SIB corresponding to the redundancy version number 0, and the UE needs to receive, in a next SIB period, the SIB corresponding to the redundancy version number 0. This may increase a delay used by the UE to obtain correct system information.

SUMMARY

This application provides a method for transmitting system information, an apparatus, and a system, to reduce a delay in obtaining, by UE, system information having a redundancy version number of 0.

To achieve the foregoing objective, the following technical solutions are used in this application.

According to a first aspect, this application provides a method for transmitting system information. The method may include: generating a SIB; and send the SIB in N time units in one SIB period, where a redundancy version number of the SIB sent in the first time unit in the N time units is 0; the SIB period includes T time unit groups, and the T time unit groups include $T_P$ candidate SIB sending time unit groups, where $T_P \leq T$; one time unit group includes a time units used for a clear channel assessment CCA; and one time unit group in the $T_P$ time unit groups includes r candidate SIB sending time units, where N is a total quantity of candidate SIB sending time units included in a time unit group in which a CCA succeeds in the $T_P$ candidate SIB sending time unit groups in the SIB period, $N \leq T_P \times r$, and T and $T_P$ are positive integers.

According to a second aspect, this application provides a method for transmitting system information. The method may include: receiving a SIB in N time units in one SIB period; and parsing the SIB received in the N time units in the SIB period. A redundancy version number of the SIB information received in the first time unit in the N time units is 0. The SIB period includes T time unit groups, and the T time unit groups include $T_P$ candidate SIB receiving time unit groups, where $T_P \leq T$; one time unit group includes a time units used for a clear channel assessment CCA; and one time unit group in the $T_P$ time unit groups includes r candidate SIB receiving time units, where N is a total quantity of candidate SIB receiving time units included in a time unit group in which a CCA succeeds in the $T_P$ candidate SIB receiving time unit groups in the SIB period, $N \leq T_P \times r$, and T and $T_P$ are positive integers.

According to the methods for transmitting system information provided in this application, after an access network device generates a SIB, the access network device may send the SIB to a terminal device in N time units in one SIB period, and a redundancy version number of the SIB sent in the first time unit in the N time units is 0. After the terminal device receives the SIB in the N time units, the terminal device may parse the SIB received in the N time units. Compared with the prior art, because a redundancy version number of the SIB sent by the access network device in the first time unit in the N time units in the SIB period is 0, in a process in which the terminal device receives the SIB, even if a first CCA fails in the current SIB period, the terminal device may still obtain the SIB having the redundancy version number of 0 in the current SIB period. In addition, the SIB having the redundancy version number of 0 includes a relatively large quantity of information bits, and has relatively good demodulation performance in a same channel environment. Therefore, the terminal can obtain a correct SIB at a higher probability by parsing the SIB. In this way, a delay in obtaining correct system information by the terminal device can be reduced.

According to a third aspect, this application provides an access network device. The access network device includes a processing module and a sending module. The processing module may be configured to generate a SIB; and the sending module may be configured to send, in N time units in one SIB period, the SIB generated by the processing module, where a redundancy version number of the SIB sent in the first time unit in the N time units is 0; the SIB period includes T time unit groups, and the T time unit groups include $T_P$ candidate SIB sending time unit groups, where $T_P \leq T$; one time unit group includes a time units used for a clear channel assessment CCA; and one time unit group in the $T_P$ time unit groups includes r candidate SIB sending time units, where N is a total quantity of candidate SIB sending time units included in a time unit group in which a CCA succeeds in the $T_P$ candidate SIB sending time unit groups in the SIB period, $N \leq T_P \times r$, and T and $T_P$ are positive integers.

For descriptions about technical effects of the third aspect, refer to the descriptions about the technical effects of the first aspect. Details are not further described herein.

In the first aspect and the third aspect, a redundancy version number of the SIB sent in the SIB sending time unit in each candidate SIB sending time unit group in the SIB period is 0.

In the first aspect and the third aspect, a redundancy version number Rv of the SIB sent in an $m^{th}$ SIB sending time unit in one candidate SIB sending time unit group in the SIB period satisfies $$Rv = \left\lceil \frac{3}{2} \times k \right\rceil \%4,$$

where k satisfies k=(m−1) % 4, 0<m≤r, m is a positive integer, and % represents modulo.

In this application, redundancy version numbers of the SIB sent in r SIB sending time units sequentially in one candidate SIB sending time unit group may be determined based on the foregoing formula, and in each candidate SIB sending time unit group, a redundancy version number of the SIB sent in the first SIB sending time unit is 0. In this way, transmission of the SIB having the redundancy version number of 0 can be ensured, a delay in obtaining correct system information by a terminal can be reduced, and in one SIB sending time unit group, the SIB of different redundancy version numbers may further be sent, so that a SIB coding gain can be improved, thereby further improving demodulation performance of the SIB sent in the sending time unit group.

In the first aspect and the third aspect, if a CCA succeeds in a current candidate SIB sending time unit group, and a CCA succeeds in a previous candidate SIB sending time unit group adjacent to the current candidate SIB sending time unit group, a redundancy version number Rv of the SIB sent in an $m^{th}$ SIB sending time unit in the current candidate SIB sending time unit group satisfies $$Rv = \left\lceil \frac{3}{2} \times k \right\rceil \%4,$$

where k satisfies k=[(n−1)×r+m] % 4, 0<m≤r, n indicates that the current candidate SIB sending time unit group is an $n^{th}$ time unit group in consecutive time unit groups in which a CCA succeeds in the candidate SIB sending time unit groups, m and n are positive integers, ⌈ ⌉ represents rounding up, and % represents modulo.

In this application, the redundancy version numbers of the SIB sent in the r SIB sending time units in each time unit group in the consecutive time unit groups in which the CCA succeeds in the $T_P$ candidate SIB sending time unit groups may be determined by using the foregoing formula, and the redundancy version numbers are cyclically distributed in an order of 0, 2, 3, and 1 in the consecutive time unit groups in which the CCA succeeds. In other words, it is not limited that a redundancy version number of the SIB sent in the first SIB sending time unit in each time unit group (which is a SIB sending time unit group) in the consecutive time unit groups in which the CCA succeeds is 0. In this way, transmission of the SIB having the redundancy version number of 0 can be ensured, and a delay in obtaining correct system information by a terminal can be reduced. In addition, a SIB coding gain can be ensured in one SIB period, and demodulation performance of the SIB sent in the SIB period can be improved.

In the first aspect and the third aspect, if a CCA succeeds in a current candidate SIB sending time unit group, and a CCA fails in a previous candidate SIB sending time unit group adjacent to the current sending time unit group, a redundancy version number Rv of the SIB sent in an $m^{th}$ SIB sending time unit in the current candidate SIB sending time unit group satisfies $$Rv = \left\lceil \frac{3}{2} \times k \right\rceil \%4,$$

where k satisfies k=(m−1) % 4, 0<m≤r, m is a positive integer, and % represents modulo.

In this application, if the CCA succeeds in the current candidate SIB sending time unit group, and the CCA fails in the previous candidate SIB sending time unit group adjacent to the current sending time unit group, redundancy version numbers of the SIB sent in the r SIB sending time units in the current candidate SIB sending time unit group may be determined by using the foregoing formula, and a redundancy version number of the SIB sent in the first SIB sending time unit in the current candidate SIB sending time unit group is 0. In this way, transmission of the SIB having the redundancy version number of 0 can be ensured, and a delay in obtaining correct system information by a terminal can be reduced.

In the first aspect and the third aspect, the redundancy version number Rv of the SIB sent in the $m^{th}$ SIB sending time unit in the SIB period satisfies $$Rv = \left\lceil \frac{3}{2} \times k \right\rceil \%4,$$

where k satisfies k=(m−1) % 4, 0<m≤N, and m is a positive integer.

In this application, redundancy version numbers of the SIB sent in the N sending time units sequentially may be determined by using the foregoing formula, and the redundancy version numbers are cyclically distributed in an order of 0, 2, 3, and 1. In other words, it is not limited that a redundancy version number of the SIB sent in the first SIB sending time unit in each SIB sending time unit group of all SIB sending time unit groups is 0. In this way, transmission of the SIB having the redundancy version number of 0 can be ensured, and system complexity can be reduced. In other words, provided that the CCA succeeds in the candidate SIB sending time unit group, the SIB is cyclically sent in an order of redundancy version numbers 0, 2, 3, and 1 in an entire SIB period.

According to a fourth aspect, this application provides a terminal device. The terminal device includes a receiving module and a processing module. The receiving module may be configured to receive a SIB in N time units in one SIB period, where a redundancy version number of the SIB information received in the first time unit in the N time units is 0; the SIB period includes T time unit groups, and the T time unit groups include $T_P$ candidate SIB receiving time unit groups, where $T_P \leq T$; one time unit group includes a time units used for a clear channel assessment CCA; and one time unit group in the $T_P$ time unit groups includes r candidate SIB receiving time units, where N is a total quantity of candidate SIB receiving time units included in a time unit group in which a CCA succeeds in the $T_P$ candidate SIB receiving time unit groups in the SIB period, $N \leq T_P \times r$, and T and $T_P$ are positive integers; and the processing module may be configured to parse the SIB that is received by the receiving module in the N time units in the SIB period.

For descriptions about technical effects of the fourth aspect, refer to the descriptions about the technical effects of the second aspect. Details are not described herein again.

In the second aspect and the fourth aspect, a redundancy version number of the SIB received in the first SIB receiving time unit in each candidate SIB receiving time unit group in the SIB period is 0.

In the second aspect and the fourth aspect, a redundancy version number Rv of the SIB received in an $m^{th}$ SIB receiving time unit in one candidate SIB receiving time unit group in the SIB period satisfies $$Rv = \left\lceil \frac{3}{2} \times k \right\rceil \%4,$$

where k satisfies k=(m−1) % 4, 0<m≤r, m is a positive integer, ⌈⌉ represents rounding up, and % represents modulo.

In the second aspect and the fourth aspect, if a CCA succeeds in a current candidate SIB receiving time unit group, and a CCA succeeds in a previous candidate SIB receiving time unit group adjacent to the current candidate SIB receiving time unit group, a redundancy version number Rv of the SIB received in an $m^{th}$ SIB sending time unit in the current candidate SIB receiving time unit group satisfies $$Rv = \left\lceil \frac{3}{2} \times k \right\rceil \%4,$$

where k satisfies k=[(n−1)×r+m] % 4, 0<m≤r, n indicates that the current candidate SIB receiving time unit group is an $n^{th}$ time unit group in consecutive time unit groups in which a CCA succeeds in the candidate SIB receiving time unit groups, m and n are positive integers, ⌈⌉ represents rounding up, and % represents modulo.

In the second aspect and the fourth aspect, if a CCA succeeds in a current candidate SIB receiving time unit group, and a CCA fails in a previous candidate SIB receiving time unit group adjacent to the current candidate SIB receiving time unit group, a redundancy version number Rv of the SIB received in an $m^{th}$ SIB sending time unit in the current candidate SIB sending time unit group satisfies $$Rv = \left\lceil \frac{3}{2} \times k \right\rceil \%4,$$

where k satisfies k=(m−1) % 4, 0<m≤r, m is a positive integer, ⌈⌉ represents rounding up, and % represents modulo.

In the second aspect and the fourth aspect, a redundancy version number Rv of the SIB received in an $m^{th}$ SIB receiving time unit in the SIB period satisfies $$Rv = \left\lceil \frac{3}{2} \times k \right\rceil \%4,$$

where k satisfies k=(m−1) % 4, 0<m≤N−1, m is a positive integer, ⌈⌉ represents rounding up, and % represents modulo.

In the first aspect to the fourth aspect, one time unit group is an mframe, and a quantity of times of CCAs on a data segment/data channel/data frequency in one time unit group is 1.

According to a fifth aspect, a communications apparatus is provided. The communications apparatus may be an access network device, and the communications apparatus may include a processor and a memory coupled to the processor. The processor is configured to support the apparatus in performing a corresponding function in the method according to the first aspect. The memory is configured to couple to the processor, and store a necessary program instruction and necessary data of the apparatus. In addition, the apparatus may further include a communications interface, configured to support the apparatus in communicating with another network element.

According to a sixth aspect, a computer-readable storage medium is provided, and the computer-readable storage medium may include a computer instruction. When the computer instruction is run on a computer, the computer is enabled to perform the method for transmitting system information according to the first aspect.

According to a seventh aspect, a computer program product including a computer instruction is provided. When the computer program product runs on a computer, the computer is enabled to perform the method for transmitting system information according to the first aspect.

According to an eighth aspect, a communications apparatus is provided. The communications apparatus may be a terminal device, and the communications apparatus may include a processor and a memory coupled to the processor. The processor is configured to support the apparatus in performing a corresponding function in the method according to the first aspect. The memory is configured to couple to the processor, and store a necessary program instruction and necessary data of the apparatus. In addition, the apparatus may further include a communications interface, configured to support the apparatus in communicating with another network element.

According to a ninth aspect, a computer-readable storage medium is provided, and the computer-readable storage medium may include a computer instruction. When the computer instruction is run on a computer, the computer is enabled to perform the method for transmitting system information according to the second aspect.

According to a tenth aspect, a computer program product including a computer instruction is provided. When the computer program product runs on a computer, the computer is enabled to perform the method for transmitting system information according to the second aspect.

According to an eleventh aspect, a wireless communications system is provided. The wireless communications system may include an access network device and a terminal device. The access network device may perform the method for transmitting system information in the first aspect, and the terminal device may perform the method for transmitting system information in the second aspect.

In this application, the access network device may be the access network device in the third aspect or the fifth aspect, and the terminal device may be the terminal device in the fourth aspect or the eighth aspect.

For descriptions about related content and technical effects of the fifth aspect to the eleventh aspect, refer to the descriptions about the related content and the technical effects of the first aspect and the second aspect. Details are not described herein again.

DESCRIPTION OF EMBODIMENTS

Figure 1:
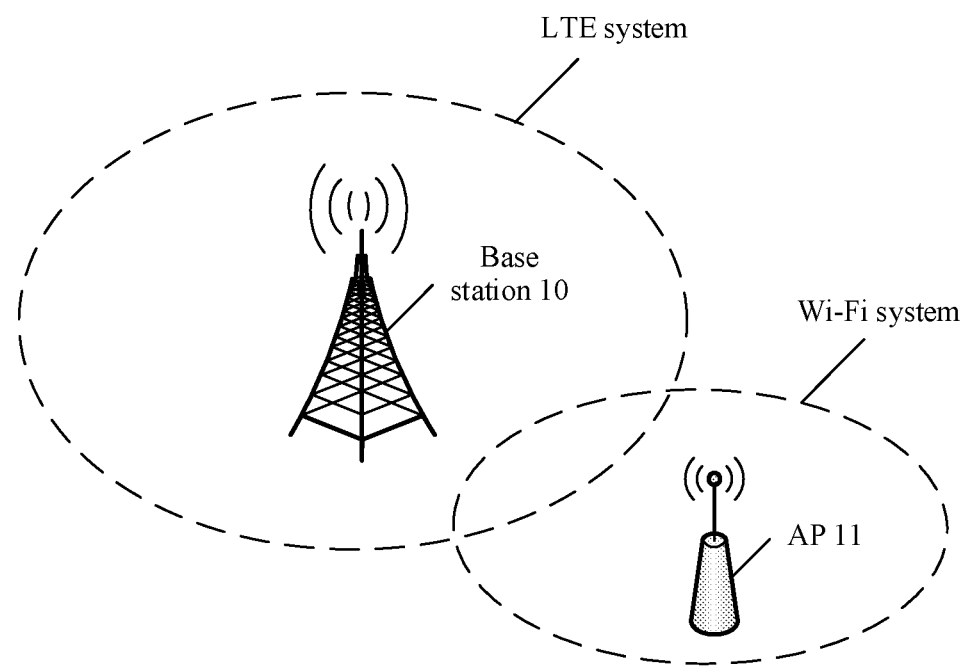
FIG. 1 is a schematic diagram of reusing an unlicensed spectrum by different systems according to an embodiment of the present invention.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of the present invention, the terms "first", "second", and the like are used to distinguish between different objects but are not used to describe a particular order of the objects. For example, "first location", "second location", and the like are used to distinguish between different locations but are not used to describe a particular order of the locations.

In addition, in the embodiments of the present invention, the word "example" or "for example" is used to represent giving an example, an illustration, or a description. Any embodiment or design scheme described as "example" or "for example" in the embodiments of the present invention should not be explained as being more preferred or having more advantages than another embodiment or design scheme. Exactly, use of the word "example" or "for example" or the like is intended to present a relative concept in a specific manner.

In descriptions of the embodiments of the present invention, unless otherwise stated, "a plurality of" means two or more than two. For example, a plurality of processing units are two or more processing units. A plurality of systems are two or more systems.

First, some concepts in the method for determining a redundancy version number of system information, the apparatus, and the system provided in the embodiments of the present invention are explained and described.

CCA is a channel assessment technology, and is applied to a scenario in which data is sent by using a resource on an unlicensed spectrum, to implement time division multiplexing of a channel, and avoid mutual interference generated when data is sent by simultaneously occupying a channel. Specifically, in a process in which an access network device sends data (for example, a SIB 1) to a terminal device, energy of a current channel is measured to determine whether the channel is idle. If the energy of the current channel is greater than or equal to a channel energy threshold, it is considered that the channel is not idle, to be specific, the channel is already occupied, and the access network device cannot use the channel to send data. If the energy of the current channel is less than the channel energy threshold, it is considered that the channel is idle, that is, the channel is not occupied, and the access network device may send data by using the channel.

Redundancy version number: In a data transmission process, the redundancy version number may indicate a start point of transmitted data in a buffer, to be specific, a location that is in the buffer and from which data is read. Different redundancy version numbers of the data indicate different start points of the data. Usually, the redundancy version number may be 0, 1, 2, or 3.

It should be noted that, in the embodiments of the present invention, a case in which the energy of the current channel is greater than or equal to the channel energy threshold is considered as a CCA failure, and a case in which the energy of the current channel is less than the channel energy threshold is considered as a CCA success.

In the embodiments of the present invention, a communications apparatus 1 may send a SIB to a communications apparatus 2. The communications apparatus 1 may be an access network device, and the communications apparatus 2 may be a terminal device. In the following embodiments, an example in which the communications apparatus 1 is the access network device and the communications apparatus 2 is the terminal device is used to describe the method for transmitting system information, the apparatus, and the system that are provided in the embodiments of the present invention.

Based on the problem existing in the background, the embodiments of the present invention provide a method for transmitting system information, an apparatus, and a system. After generating a SIB, an access network device may send the SIB in N time units in one SIB period. In addition, a redundancy version number of the SIB sent in the first time unit in the N time units is 0. Therefore, in a process in which a terminal device receives the SIB, even if a first CCA fails in the current SIB period, the terminal device may still obtain the SIB having the redundancy version number of 0 in the current SIB period. In addition, the SIB having the redundancy version number of 0 includes a relatively large quantity of information bits, and has relatively good demodulation performance in a same channel environment. Therefore, the terminal can obtain a more correct SIB by parsing the SIB. In this way, a delay in obtaining correct system information by the terminal device can be reduced.

The method for transmitting system information, the apparatus, and the system provided in the embodiments of the present invention may be applied to a scenario in which system information is transmitted on an unlicensed spectrum. In the field of communications technologies, systems of different standards may reuse an unlicensed spectrum. FIG. 1 is a schematic diagram of reusing an unlicensed spectrum by different systems according to an embodiment of the present invention. An LTE system and a Wi-Fi system are used as an example. In FIG. 1, a base station 10 in the LTE system and an access point (access point, AP) 11 in the Wi-Fi system may reuse an unlicensed spectrum in a CCA manner. To be specific, before sending data, the base station 10 and the AP 11 may first assess whether an unlicensed spectrum resource (which may be understood as a channel of the unlicensed spectrum) is idle. When determining that the channel is idle, the base station 10 or the AP 11 may send data on the channel. That is, in the base station 10 and the AP 11, at a same moment, only one device can contend for the idle resource on the unlicensed spectrum, and transmit data within a limited time length. A case in which the base station 10 and the AP 11 simultaneously detect that a channel is idle and simultaneously send data belongs to a channel collision, and is not covered by this solution.

Figure 2:
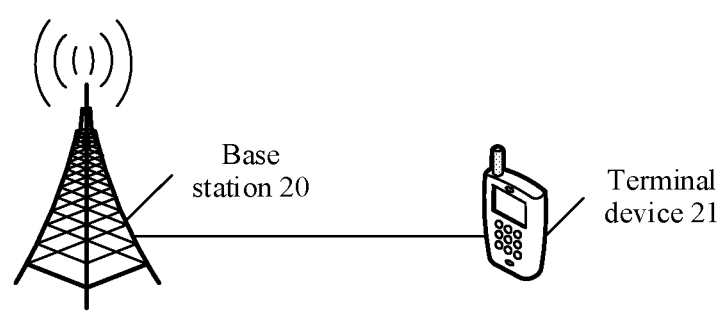
FIG. 2 is a schematic architectural diagram of a communications system according to an embodiment of the present invention.

The method for transmitting system information and the apparatus provided in the embodiments of the present invention may be applied to a wireless communications system. The wireless communications system may be an Internet of Things system, an LTE system, an LTE-Advanced (LTE-Advanced, LTE-A) system, a system using a fifth generation mobile communications technology (referred to as a 5G system below), or the like. FIG. 2 is a schematic architectural diagram of a communications system according to an embodiment of the present invention. In FIG. 2, the communications system includes a base station 20 and a terminal device 21. The base station 20 may perform uplink data and downlink data transmission with the terminal device 21.

Figure 3:
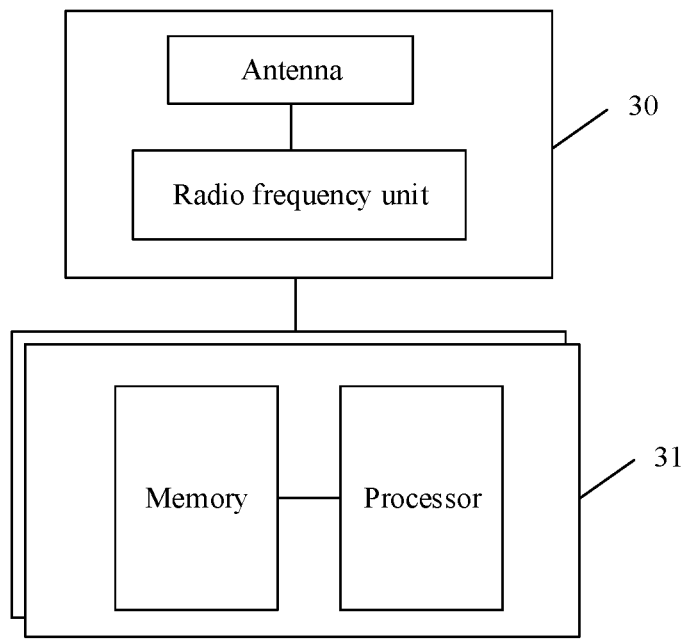
FIG. 3 is a schematic diagram of hardware of a base station according to an embodiment of the present invention.

The access network device provided in the embodiments of the present invention may be a device such as a commonly used base station, an evolved node base station (evolved node base station, eNB), a next generation node base station (next generation node base station, gNB) in a 5G system, a new radio base station (new radio eNB), a macro base station, a micro base station, a high frequency base station, or a transmission and reception point (transmission and reception point, TRP). For example, in the embodiments of the present invention, the commonly used base station is used as an example to describe a hardware structure of the network device. The following describes components of the base station provided in the embodiments of the present invention in detail with reference to FIG. 3. As shown in FIG. 3, the base station provided in an embodiment of the present invention may include a part 30 and a part 31. The part 30 is mainly configured to: send and receive a radio frequency signal, and convert the radio frequency signal and a baseband signal. The part 31 is mainly configured to: perform baseband processing, control the base station, and the like. The part 30 may be usually referred to as a transceiver unit, a receiver/transmitter, a transceiver circuit, a transceiver, or the like. The part 31 is usually a control center of the base station, and is usually referred to as a processing unit.

The transceiver unit in the part 30 may also be referred to as a receiver/transmitter, a transceiver, or the like, and includes an antenna and a radio frequency unit. The radio frequency unit is mainly configured to perform radio frequency processing. Optionally, a component that is in the part 30 and that is configured to implement a receiving function may be considered as a receiving unit, and a component that is configured to implement a sending function may be considered as a sending unit. That is, the part 30 includes the receiving unit and the sending unit. The receiving unit may also be referred to as a receiver, a receiver, a receiver circuit, or the like. The sending unit may be referred to as a transmitter, a transmitter, a transmitter circuit, or the like.

The part 31 may include one or more boards. Each board may include one or more processors and one or more memories, and the processor is configured to read and execute a program in the memory, to implement a baseband processing function and controlling of the base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors. The memory and the processor may be integrated together, or may be disposed independently. In some embodiments, the part 30 and the part 31 may be integrated together or may be disposed independently. In addition, all functions of the part 31 may be integrated into one chip for implementation. Alternatively, some functions may be integrated into one chip for implementation and some other functions are integrated into one or more other chips for implementation. This is not limited in this application.

The terminal device in the embodiments of the present invention may be a mobile phone, a tablet computer, a notebook computer, an ultra-mobile personal computer (ultra-mobile personal computer, UMPC), a netbook, a personal digital assistant (Personal Digital Assistant, PDA), or the like.

Figure 4:
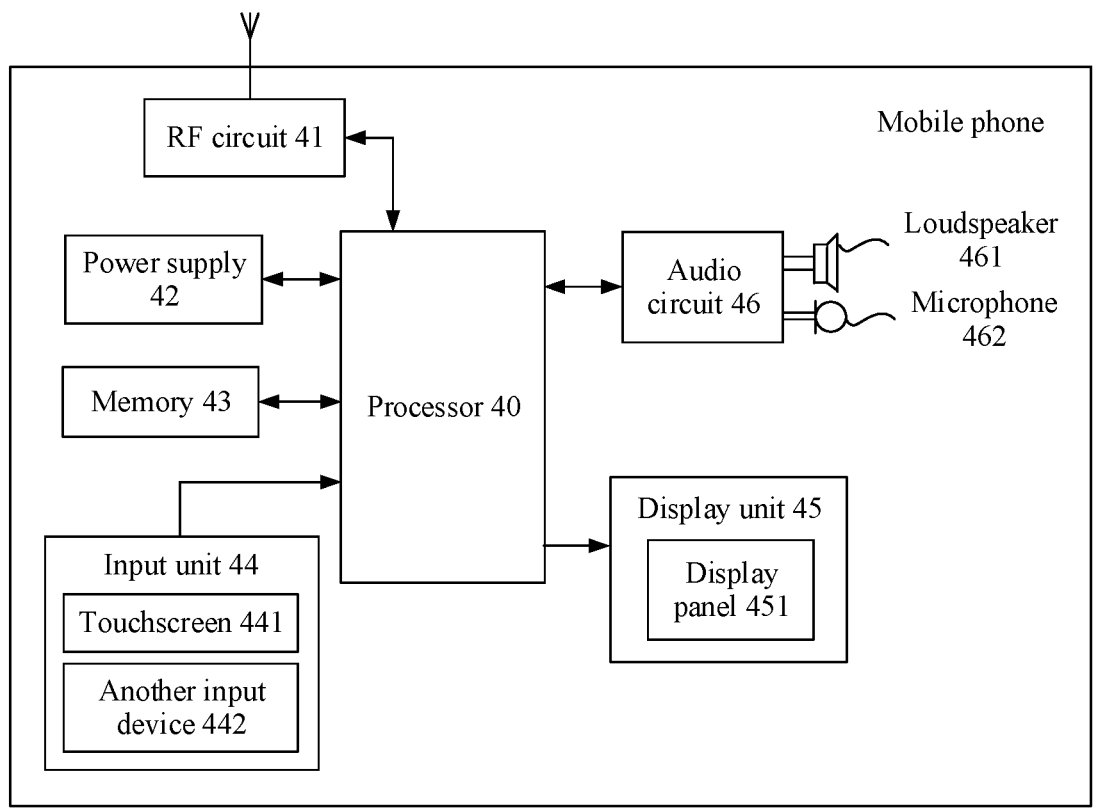
FIG. 4 is a schematic diagram of hardware of a mobile phone according to an embodiment of the present invention.

For example, in an embodiment of the present invention, that the terminal device is a mobile phone is used as an example to introduce a hardware structure of the terminal device. Components of the mobile phone in this embodiment of the present invention are described in detail below with reference to FIG. 4. As shown in FIG. 4, the mobile phone provided in this embodiment of the present invention includes components such as a processor 40, a radio frequency (radio frequency, RF) circuit 41, a power source 42, a memory 43, an input unit 44, a display unit 45, and an audio circuit 46. A person skilled in the art may understand that a structure of the mobile phone shown in FIG. 4 constitutes no limitation on the mobile phone, and the mobile phone may include more or fewer components than those shown in FIG. 4, or may include a combination of some of the components shown in FIG. 4, or may include components arranged differently from those shown in FIG. 4.

The processor 40 is a control center of the mobile phone, and connects to various parts of the entire mobile phone by using various interfaces and lines. The processor 40 executes various functions of the mobile phone and processes data by running or executing a software program and/or a module stored in the memory 43 and by invoking data stored in the memory 43, to perform overall monitoring on the mobile phone. Optionally, the processor 40 may include one or more processing units. Optionally, an application processor and a modem processor may be integrated into the processor 40. The application processor mainly processes an operating system, a user interface, an application program, and the like. The modem processor mainly processes wireless communication. It may be understood that the modem processor may be alternatively a processor separated from the processor 40.

The RF circuit 41 may be configured to receive and send a signal in an information receiving/sending process or a call process. For example, after receiving downlink information from a base station, the RF circuit 11 sends the downlink information to the processor 40 for processing; and sends uplink data to the base station. The RF circuit usually includes but is not limited to an antenna, at least one amplifier, a transceiver, a coupler, a low noise amplifier (low noise amplifier, LNA), a duplexer, and the like. In addition, the mobile phone may further implement wireless communication with another device in a network by using the RF circuit 41. The wireless communication may use any communication standard or protocol, including but not limited to a global system for mobile communications (global system of mobile communication, GSM), a general packet radio service (general packet radio service, GPRS), code division multiple access (code division multiple access, CDMA), wideband code division multiple access (wideband code division multiple access, WCDMA), LTE, an email, a short message service (short message service, SMS), and the like.

The power supply 42 may be configured to supply power to each component of the mobile phone, and the power supply 42 may be a battery. Optionally, the power supply may be logically connected to the processor 40 by using a power management system, to implement functions such as charging management, discharging management, and power consumption management by using the power management system.

The memory 43 may be configured to store the software program and/or the module. The processor 40 executes various function applications of the mobile phone and processes data by running the software program and/or the module stored in the memory 43. The memory 43 may mainly include a program storage area and a data storage area. The program storage area may store an operating system, an application program required by at least one function (such as a sound playback function or an image play function), or the like. The data storage area may store data (such as audio data, image data, or an address book) created based on use of the mobile phone, or the like. Further, the memory 43 may include a high speed random access memory, and may further include a non-volatile memory such as at least one magnetic disk storage device, a flash memory device, or another volatile solid-state storage device.

The input unit 44 may be configured to receive entered digital or character information, and generate key signal input related to user setting and function control of the mobile phone. Specifically, the input unit 44 may include a touchscreen 441 and another input device 442. The touchscreen 441 is also referred to as a touch panel, may collect a touch operation (for example, an operation performed by a user on the touchscreen 441 or near the touchscreen 441 by using any appropriate object or accessory such as a finger or a stylus) performed by the user on or near the touchscreen 441, and drive a corresponding connected apparatus based on a preset program. Optionally, the touchscreen 441 may include two parts: a touch detection apparatus and a touch controller. The touch detection apparatus detects a touch direction of the user, detects a signal generated by the touch operation, and transmits the signal to a touch controller. The touch controller receives touch information from the touch detection apparatus, converts the touch information into touch point coordinates, and sends the touch point coordinates to the processor 40. Moreover, the touch controller can receive and execute a command sent by the processor 40. In addition, the touchscreen 441 may be implemented in a plurality of types such as a resistive type, a capacitive type, an infrared type, and a surface acoustic wave type. The another input device 442 may include but is not limited to one or more of a physical keyboard, a function key (such as a volume control key and a power supply switch key), a trackball, a mouse, a joystick, and the like.

The display unit 45 may be configured to display information entered by the user or information provided for the user, and various menus of the mobile phone. The display unit 45 may include a display panel 451. Optionally, the display panel 451 may be configured in a form of a liquid crystal display (liquid crystal display, LCD), an organic light-emitting diode (organic light-emitting diode, OLED), or the like. Further, the touchscreen 441 may cover the display panel 451. After detecting a touch operation performed on or near the touchscreen 441, the touchscreen 441 sends the touch operation to the processor 40 to determine a type of a touch event, and then the processor 40 provides corresponding visual output on the display panel 451 based on the type of the touch event. In FIG. 4, the touchscreen 441 and the display panel 451 serve as two independent components to implement input and output functions of the mobile phone. However, in some embodiments, the touchscreen 441 and the display panel 451 may be integrated to implement the input and output functions of the mobile phone.

The audio circuit 46, a loudspeaker 461, and a microphone 462 are configured to provide an audio interface between the user and the mobile phone. On one hand, the audio circuit 46 may convert received audio data into an electrical signal, and transmit the electrical signal to the loudspeaker 461, and the loudspeaker 461 converts the electrical signal into a sound signal for output. On the other hand, the microphone 462 converts a collected sound signal into an electrical signal. The audio circuit 46 receives the electrical signal, converts the electrical signal into audio data, and then outputs the audio data to the RF circuit 41 by using the processor 40, to send the audio data to, for example, another mobile phone, or outputs, by using the processor 40, the audio data to the memory 43 for further processing.

Optionally, the mobile phone shown in FIG. 4 may further include various sensors, for example, a gyroscope sensor, a hygrometer sensor, an infrared sensor, and a magnetometer sensor. Details are not described herein.

Optionally, the mobile phone shown in FIG. 4 may further include a Wi-Fi module, a Bluetooth module, and the like. Details are not described herein.

Figure 5:
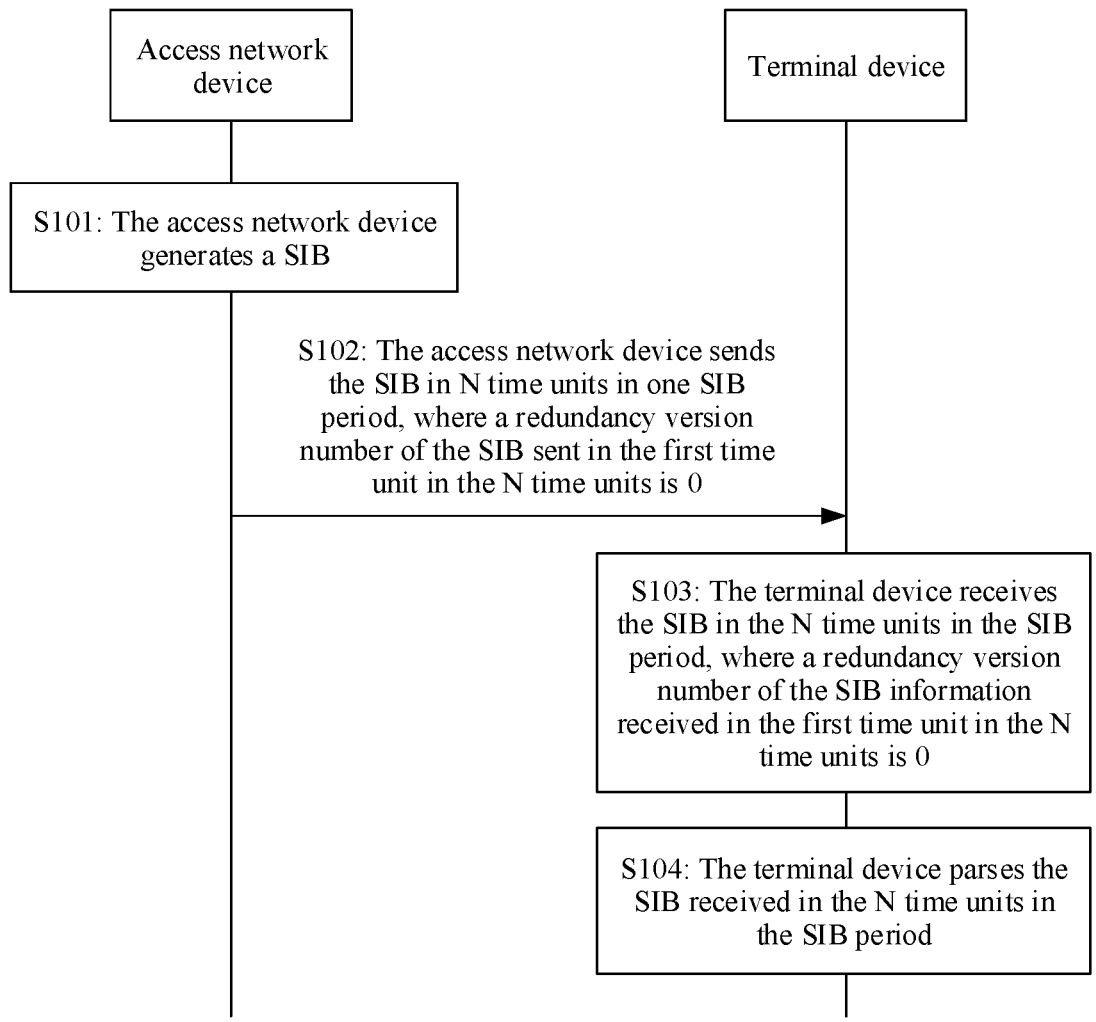
FIG. 5 is a schematic diagram of a method for transmitting system information according to an embodiment of the present invention.

With reference to the foregoing application scenario and wireless communications system, as shown in FIG. 5, the method for transmitting system information according to an embodiment of the present invention may include S101 to S104.

S101: An access network device generates a SIB.

In this embodiment of the present invention, in a process in which the access network device sends the SIB (which may be a SIB 1) to the terminal device, the access network device sends the SIB to the terminal device after performing cyclic redundancy check (cyclic redundancy check, CRC), coding, rate matching, scrambling, modulation, and resource mapping on the SIB.

The SIB generated by the access network device is a SIB obtained after the access network device encodes a source SIB and performs rate matching on the encoded source SIB. In an encoding process, an encoding module of the access network device encodes a bit stream of the source SIB. For example, the access network device uses a turbo encoding method. If a bit rate is ⅓, a bit stream of the source SIB is $c_0, c_1, c_2, \ldots, c_{K-1}$, where K is a bit length of the source SIB, and the encoded SIB is $d_0^i, d_1^i, d_2^i, \ldots, d_{D-1}^i$, where D is a bit length of the encoded SIB, D≥K (for example, D=K+4), and i may be 0, 1, or 2. It can be learned that the encoded SIB includes three bit streams. The first bit stream is referred to as an information bit stream, and the second bit stream and the third bit stream are each referred to as a check bit stream. The access network device encodes the source SIB to obtain the encoded SIB, and then the access network device performs rate matching on the encoded SIB. Specifically, a sub-block interleaving module in a rate matching module interleaves each bit stream in the encoded SIB, to obtain three data matrices that each have a size of R×C (for example, C may be 32, R is an integer greater than and closest to D/32), and the three data matrices (namely, the SIB obtained through interleaving by using the sub-interleaving module) are sequentially stored in a ring buffer of the access network device.

It should be noted that the foregoing encoding process and rate matching process are both in the prior art. A detailed process of encoding and rate matching is not described in detail in the embodiments of the present invention. For a detailed process, refer to the 3GPP protocol, for example, sections 5.1.3 and 5.1.4 in 3GPP TS 36.212 V13.1.0 (2016-03).

S102: The access network device sends the SIB in N time units in one SIB period, where a redundancy version number of the SIB sent in the first time unit in the N time units is 0.

In this embodiment of the present invention, the SIB in a form of three data matrices is obtained by the sub-interleaving module in the rate matching process. After the access network device stores the SIB in the ring buffer of the access network device, the access network device selects, from the ring buffer based on a redundancy version number of the SIB that is configured by a higher layer (where different redundancy version numbers correspond to different start locations of the SIB in the ring buffer, and the redundancy version number may be 0, 1, 2, or 3), the SIB corresponding to the redundancy version number, and sends the SIB to the terminal device after performing other processing (for example, scrambling, modulation, or resource mapping) on the SIB.

Figure 6:
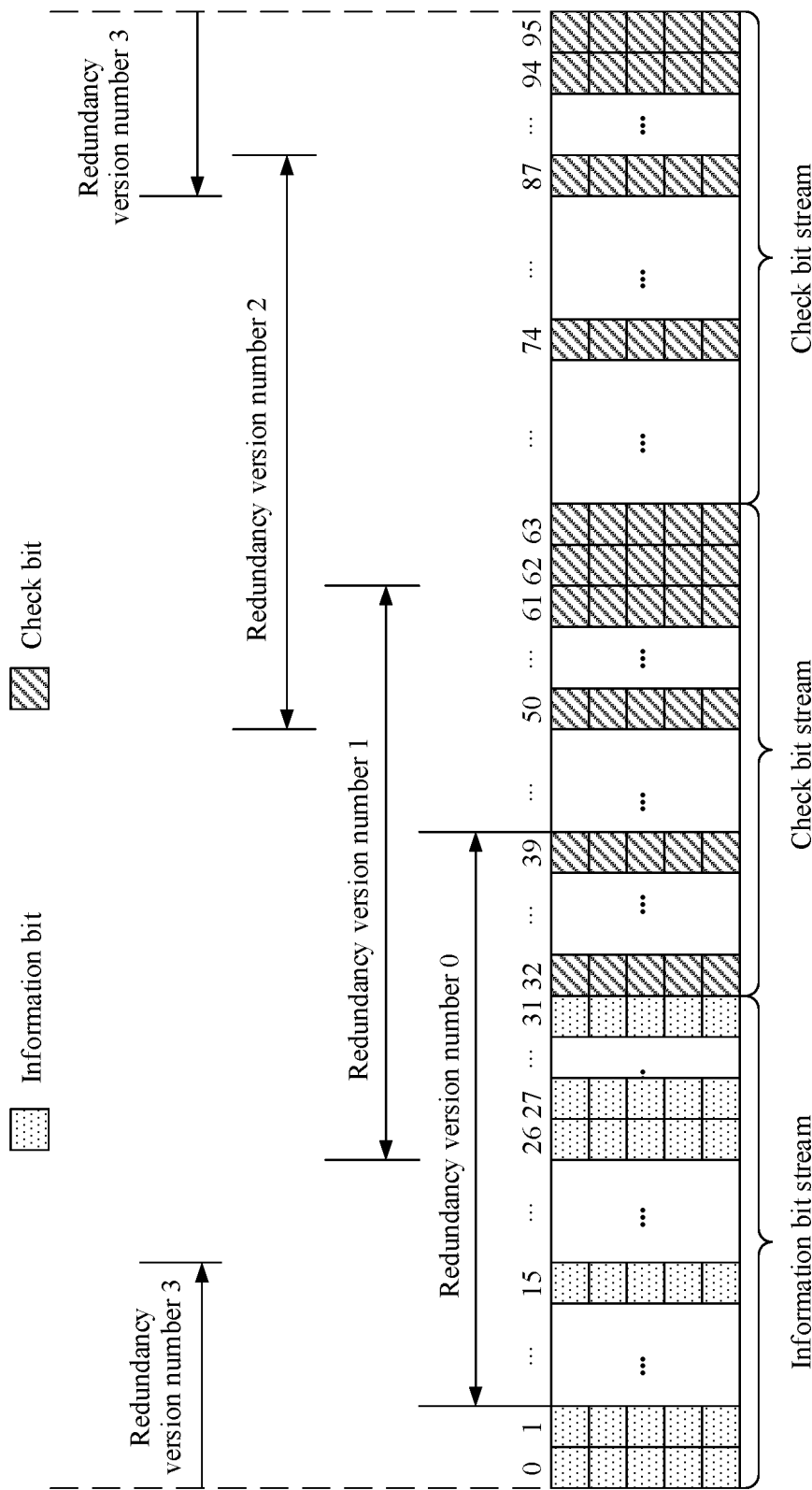
FIG. 6 is a schematic diagram of storing a SIB according to an embodiment of the present invention.

For example, FIG. 6 is a schematic diagram of storing a SIB. It is assumed that the size of each of the three data matrices obtained after the interleaving performed by the sub-interleaving module is 5×32. In this case, a size of the SIB stored in the ring buffer is 96×5. If the access network device reads the SIB in the ring buffer, the code rate of the SIB is 0.842 (where usually, the code rate is related to a quantity of columns of the SIB that is in the ring buffer and that corresponds to the redundancy version number. For example, the SIB that is in the ring buffer and that corresponds to the redundancy version number has a total of 38 columns. In this case, the code rate is a ratio of a quantity 32 of columns of each interleaved data matrix to the quantity 38 of columns of the SIB corresponding to the redundancy version number, that is, 32/38=0.842). As shown in FIG. 6, a start location of a SIB corresponding to a redundancy version number 0 is the $0^{th}$ row and the $2^{nd}$ column, columns of the SIB is the $2^{nd}$ column to the $39^{th}$ column; a start location of a SIB corresponding to a redundancy version number 1 is the $0^{th}$ row and the $26^{th}$ column, and columns of the SIB is the $26^{th}$ column to the $63^{th}$ column; a start location of the SIB corresponding to a redundancy version number 2 is the $0^{th}$ row and the $50^{th}$ column, and columns of the SIB is the $50^{th}$ column to the $87^{th}$ column; and a start location of a SIB corresponding to a redundancy version number 3 is the $0^{th}$ row and the $74^{th}$ column, and columns of the SIB is the $74^{th}$ column to the $15^{th}$ column.

With reference to FIG. 6, it can be learned that, compared with information bits included in the SIB corresponding to other redundancy version numbers (namely, redundancy version numbers 1, 2, and 3), there are a relatively large quantity of information bits included in the SIB corresponding to the redundancy version number 0 (where the information bits are at column 0 to column 31 of the corresponding SIB in the ring buffer). In this way, demodulation performance of the SIB having the redundancy version number of 0 is relatively good. To be specific, when the terminal device receives the SIB having the redundancy version number of 0, a block error rate is relatively low when the terminal device demodulates the SIB having the redundancy version number of 0. In other words, accuracy is relatively high.

In this embodiment of the present invention, the access network device may periodically send the SIB to the terminal device. One SIB period may include T time unit groups, and the T time unit groups include $T_P$ candidate SIB sending time unit groups, where $T_P \leq T$; one time unit group includes a time units used for a clear channel assessment CCA; and one time unit group in the $T_P$ time unit groups includes r candidate SIB sending time units, where N is a total quantity of candidate SIB sending time units included in a time unit group in which a CCA succeeds in the $T_P$ candidate SIB sending time unit groups in the SIB period, $N \le T_P \times r$, and T and $T_P$ are positive integers.

In the SIB period, the candidate SIB sending time unit groups are some or all of the T time unit groups (namely, the $T_P$ time unit groups) included in the SIB period. That is, the $T_P$ time unit groups may be used as candidate time unit groups for SIB sending. In one candidate SIB sending time unit group, the candidate SIB sending time units are time units (namely, the r time units) that can be used for SIB sending and that are in the one candidate SIB sending time unit group. In other words, the r time units may be used as time units that are for SIB sending and that are in one candidate sending time unit group.

Figure 7:
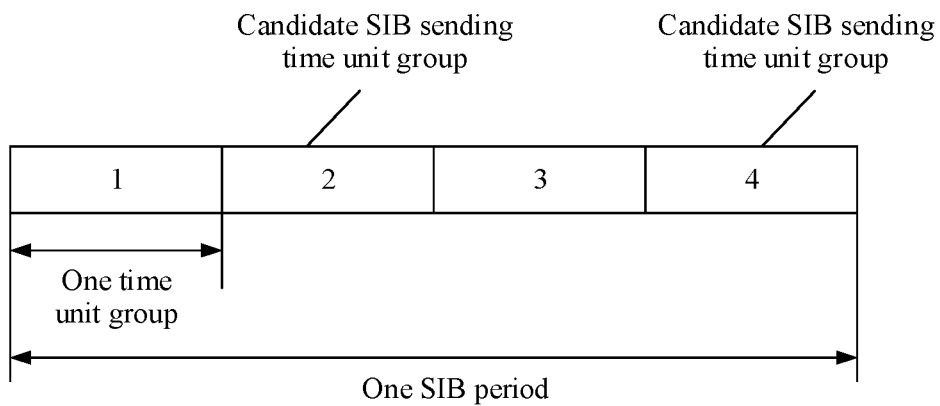
FIG. 7 is a schematic diagram of a candidate SIB sending time unit group in one SIB period according to an embodiment of the present invention.

For example, FIG. 7 is a schematic diagram of a candidate SIB sending time unit group in one SIB period. In FIG. 7, the SIB period includes four time unit groups, a time unit group 2 and a time unit group 4 may be used as candidate SIB sending time unit groups, and a time unit group 1 and a time unit group 3 are not candidate SIB sending time unit groups. In other words, time units in the time unit group 1 and the time unit group 3 cannot be used for SIB sending. In other words, correspondingly, T=4 and Tp=2. The access network device needs to perform a CCA once before sending a signal/data in the four time unit groups. For example, if a CCA corresponding to the time unit group 2 fails, and a CCA corresponding to the time unit group 4 succeeds, the access network device can send a SIB only in a time unit corresponding to the time unit group 4.

In this embodiment of the present invention, in a process in which the access network device sends the SIB to the terminal device, in one SIB period, the access network device performs a CCA in each of the T time unit groups, including a CCA of an anchor channel and a CCA of a data channel. The anchor channel is used to transmit a synchronization signal and a master information block (master information block, MIB). The synchronization signal includes a primary synchronization signal (primary synchronization signal, PSS) and a secondary synchronization signal (secondary synchronization signal, SSS). The data channel is used to transmit uplink data and/or downlink data. The time unit group may be referred to as an mframe (where one time unit group is not limited to one mframe), and a quantity of times for performing a CCA on a data segment/data channel/data frequency in each time unit group is 1.

Figure 8:
FIG. 8 is a schematic structural diagram of a time unit group in one SIB period according to an embodiment of the present invention.
Figure 8:
Figure 8:
Figure 8:
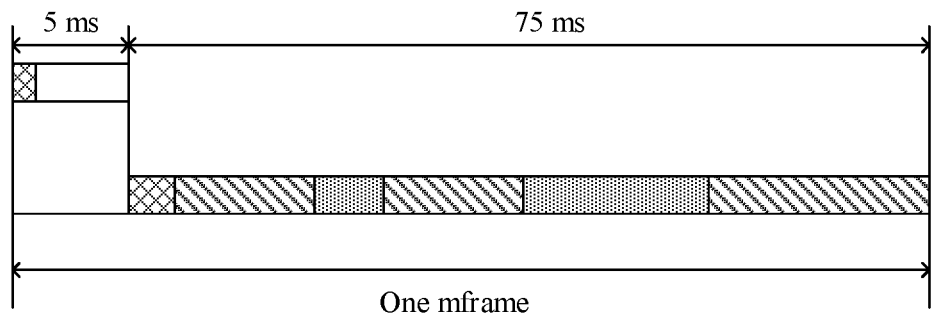

For example, as shown in FIG. 8, one time unit group is one mframe. A length of the mframe is 80 ms. One mframe includes eight radio frames, and one radio frame is 10 ms. A time length of the anchor channel is 5 ms, and a time length of the data channel is 75 ms. First, the access network device performs a CCA within a limited time length (where a time length occupied by the CCA may be 1 ms) of the anchor channel. If the CCA performed by the access network device on the anchor channel succeeds, the access network device sends a synchronization signal (including a primary synchronization signal (primary synchronization signal, PSS) and a secondary synchronization signal (secondary synchronization signal, SSS)) and a master information block (master information block, MIB) at a fixed frequency of the anchor channel. Then, the access network device performs a CCA within a limited time length (for example, the foregoing a time units, where a time length occupied by a CCA of the data channel is usually 1 ms to 3 ms) of the data channel. If the CCA performed by the access network device on the data channel succeeds, the access network device may send downlink data (for example, a SIB) in r time units (for example, downlink subframes), for sending downlink data, on the data channel.

It should be noted that CCAs mentioned in the following embodiments are each a CCA of a data channel corresponding to a time unit group. Similarly, a CCA success or a CCA failure is a CCA success or a CCA failure of a data channel corresponding to a time unit group. Details are not described in the following embodiments.

In this embodiment of the present invention, for each candidate SIB sending time unit group, the access network device performs a CCA on a data channel of the candidate SIB sending time unit group. If the CCA succeeds, the access network device sends a SIB to the terminal device in r candidate SIB sending time units in the time unit group. If the CCA fails, the access network device cannot send a SIB to the terminal device in the time unit group. The access network device continues to perform a CCA in a next candidate SIB time unit group until a CCA succeeds in a candidate SIB time unit group, and the access network device can send a SIB to the terminal device in r candidate SIB sending time units in the time unit group only when the CCA succeeds in the candidate SIB time unit group.

In this embodiment of the present invention, the time unit may be a subframe, or may be a slot, or may be another time length unit that meets an actual use requirement. This is not specifically limited in this embodiment of the present invention.

It may be understood that, in this embodiment of the present invention, there are M (namely, the foregoing $T_P \times r$) candidate SIB sending time units in one SIB period, and values of $T_P$ and r are both determined by the access network device in a SIB sending process. In the $T_P$ time unit groups, for a time unit group in which a CCA fails, r candidate SIB sending time units in the time unit group cannot be used to send the SIB. Therefore, the access network device actually sends the SIB (N≥M) to the terminal device in N time unit groups, and the N time units are evenly distributed in a time unit group in which a CCA succeeds in the $T_P$ time unit groups. Each time unit group in which a CCA succeeds has r candidate SIB sending time units, and the r candidate SIB sending time units are all used to send the SIB.

For example, assuming that one SIB period is 320 ms, one time unit group is 80 ms, and one time unit is 1 ms (namely, one subframe). In this case, the SIB period includes four time unit groups, and there are two candidate SIB sending time units in one time unit group. To be specific, the SIB is sent to the terminal device once in each of the two candidate SIB sending time units, that is, the SIB is sent twice. In this way, there are a total of eight candidate SIB sending time units in one SIB. If a CCA in one of the four time unit groups fails, the access network device actually sends the SIB to the terminal device six times in six candidate SIB sending time units in the other three time unit groups in which a CCA succeeds.

Optionally, that the access network device sends the SIB in N time units in one SIB period may be specifically implemented in the following S201 to S204.

S201: An access network device determines a quantity of candidate SIB sending time units in each candidate SIB sending time unit group in one SIB period.

It should be noted that, in this embodiment of the present invention, the SIB period includes T time unit groups, only some of the T time unit groups may be used as candidate SIB sending time unit groups, and no SIB is sent in a time unit in another time unit group (where even if a CCA in the time unit group succeeds, no SIB is sent in a time unit in the time unit group). Specifically, if a SIB period is T2, a time length of one time unit group is T1, and a preset quantity of times for sending a SIB in one SIB period is M, ⌈T2/T1⌉ represents a quantity (namely, T) of time unit groups included in the SIB period, and ⌈ ⌉ represents rounding up. It should be noted that ⌈ ⌉ is used to represent rounding up herein, and in practice, alternatively, ⌊ ⌋ may be used to represent rounding down to calculate a ratio of T2 to T1, or T2/T1 is directly used. Details are not described in the following embodiments.

When $$0 < \frac{M}{\lceil T2/T1 \rceil} < 1,$$

to be specific, a preset quantity of times for sending a SIB in one SIB period is less than a quantity of time unit groups included in the SIB period. Therefore, no SIB is sent in time units in some time unit groups. For example, M is 4, and ⌈T2/T1⌉ is 8. A maximum of four time unit groups may be used as candidate SIB sending time unit groups, and the SIB is sent once in one time unit in each candidate SIB sending time unit group, and no SIB is sent in time units in the other four time unit groups.

When $$\frac{M}{\lceil T2/T1 \rceil} \geq 1,$$

that is, a preset quantity of times for sending a SIB in one SIB period is greater than or equal to a quantity of time unit groups included in the SIB period. Therefore, all time unit groups in the SIB period may be used as candidate SIB sending time unit groups. In this case, the access network device may determine a quantity of candidate SIB sending time units in each candidate SIB sending time unit group by using the following formula, that is, determine r:

$$r = \frac{M}{\lceil T2/T1 \rceil}$$

The following Table 1 shows an example of a result of determining r when T1, T2, and M are different values.

TABLE 1

| T2 (ms) | T1 (ms) | M | r |
|---|---|---|---|
| 80 | 80 | 4 | 4 |
|  |  | 8 | 8 |
| 160 | 80 | 4 | 2 |
|  |  | 8 | 4 |
|  |  | 16 | 8 |
| 320 | 80 | 4 | 1 |
|  |  | 8 | 2 |
|  |  | 16 | 4 |
| 640 | 80 | 4 | 1 |
|  |  | 8 | 1 |
|  |  | 16 | 2 |

In Table 1, when T2 is 640 ms, T1 is 80 ms, and M is 4, it may be determined that one SIB includes eight time unit groups. In the eight time unit groups, four time unit groups may be selected as candidate SIB sending time unit groups. In addition, there is one candidate SIB sending time unit in each candidate SIB sending time unit group. For example, in the eight time unit groups, SIB sending may be performed once at an interval of one time unit group, and a SIB is sent in time units in the four candidate SIB sending time unit groups.

S202: The access network device performs a CCA from the first time unit group in the SIB period.

For a detailed description of the CCA, refer to the related description of the CCA in S101 in the foregoing embodiment. Details are not described herein again.

S203: If the CCA in the current time unit group succeeds, and the current time unit group is a candidate SIB sending time unit group, the access network device determines a redundancy version number corresponding to a SIB sent in each of r candidate SIB sending time units in the current time unit group.

It should be noted that, in this embodiment of the present invention, the access network device performs the CCA from the first time unit group. If all time unit groups in the SIB period are candidate SIB sending time unit groups, when the CCA succeeds in the current time unit group, the access network device determines a redundancy version number corresponding to a SIB sent in each of r candidate SIB sending time units in the current time unit group; or if some time unit groups in the SIB period are candidate SIB sending time unit groups, when the CCA succeeds in the current time unit group, the access network device further needs to determine whether the current time unit group is a candidate SIB sending time unit group, and if the current time unit group is the candidate SIB sending time unit group, the access network device determines a redundancy version number corresponding to a SIB sent in each of r candidate SIB sending time units in the current time unit group, or if the current time unit group is not the candidate SIB sending time unit group, the access network device does not send a SIB in a time unit in the current time unit group. In this way, the access network device does not need to determine a redundancy version number of the SIB, and the access network device may transmit other downlink data or uplink data in a time unit in the current time unit group.

In this embodiment of the present invention, in the SIB period, a redundancy version number that is of a SIB sent in the first SIB sending time unit and that is determined by the access network device is 0. That is, the redundancy version number of the SIB sent by the access network device in the first time unit in the N time units is 0.

Optionally, in this embodiment of the present invention, a method for determining, by the access network device, the redundancy version number of the SIB corresponding to the candidate SIB sending time unit may include one of the following A1 to A3:

A1: A redundancy version number Rv of the SIB sent in an $m^{th}$ SIB sending time unit in each candidate SIB sending time unit group in the SIB period satisfies $$Rv = \left\lceil \frac{3}{2} \times k \right\rceil \% 4.$$

k satisfies k=(m−1) % 4, 0<m≤r, m is a positive integer, and % represents modulo.

One candidate SIB sending time unit is used as an example. The candidate SIB sending time unit group includes r candidate SIB sending time units. When a CCA succeeds in the candidate SIB sending time unit, the r candidate SIB sending time units are all SIB sending time units. The access network device may determine, by using the formula in A1, a redundancy version number of the SIB sent in the $m^{th}$ SIB sending time unit in the r SIB sending time units. For example, if r is 4, it is determined, based on the formula in A1, that a redundancy version number of the SIB sent in the first SIB sending time unit is 0, and a redundancy version number of the SIB sent in the second SIB sending time unit is 2, a redundancy version number of the SIB sent in the third SIB sending time unit is 3, and a redundancy version number of the SIB sent in the fourth SIB sending time unit is 1.

The following Table 2 shows an example of redundancy version numbers of the SIB sent in r SIB sending time units sequentially in one candidate SIB sending time unit group when T1, T2, and M are different values.

TABLE 2

| T2 (ms) | T1 (ms) | M | r | Redundancy version number |
|---|---|---|---|---|
| 80 | 80 | 4 | 4 | 0, 2, 3, 1 |
|  |  | 8 | 8 | 0, 2, 3, 1, 0, 2, 3, 1 |
| 160 | 80 | 4 | 2 | 0, 2 |
|  |  | 8 | 4 | 0, 2, 3, 1 |
|  |  | 16 | 8 | 0, 2, 3, 1, 0, 2, 3, 1 |
| 320 | 80 | 4 | 1 | 0 |
|  |  | 8 | 2 | 0, 2 |
|  |  | 16 | 4 | 0, 2, 3, 1 |
| 640 | 80 | 4 | 1 | 0 |
|  |  | 8 | 1 | 0 |
|  |  | 16 | 2 | 0, 2 |

With reference to Table 2, it can be learned that, in one SIB period, a redundancy version number of a SIB sent in the first time unit in N time units is 0, and a redundancy version number of a SIB sent in the first candidate SIB sending time unit in each candidate SIB sending time unit group is 0.

In this embodiment of the present invention, the access network device determines redundancy version numbers of the SIB sent in r SIB sending time units separately in one candidate SIB sending time unit group, and in each candidate SIB sending time unit group in one SIB period, the foregoing method is used to determine redundancy version numbers of the SIB sent in r SIB sending time units separately. In this way, transmission of a SIB having the redundancy version number of 0 can be ensured, a delay in obtaining correct system information by a terminal can be reduced, and in one SIB sending time unit group, the SIB of different redundancy version numbers may further be sent, so that a SIB coding gain can be improved, thereby further improving demodulation performance of the SIB sent in the sending time unit group.

Figure 9:
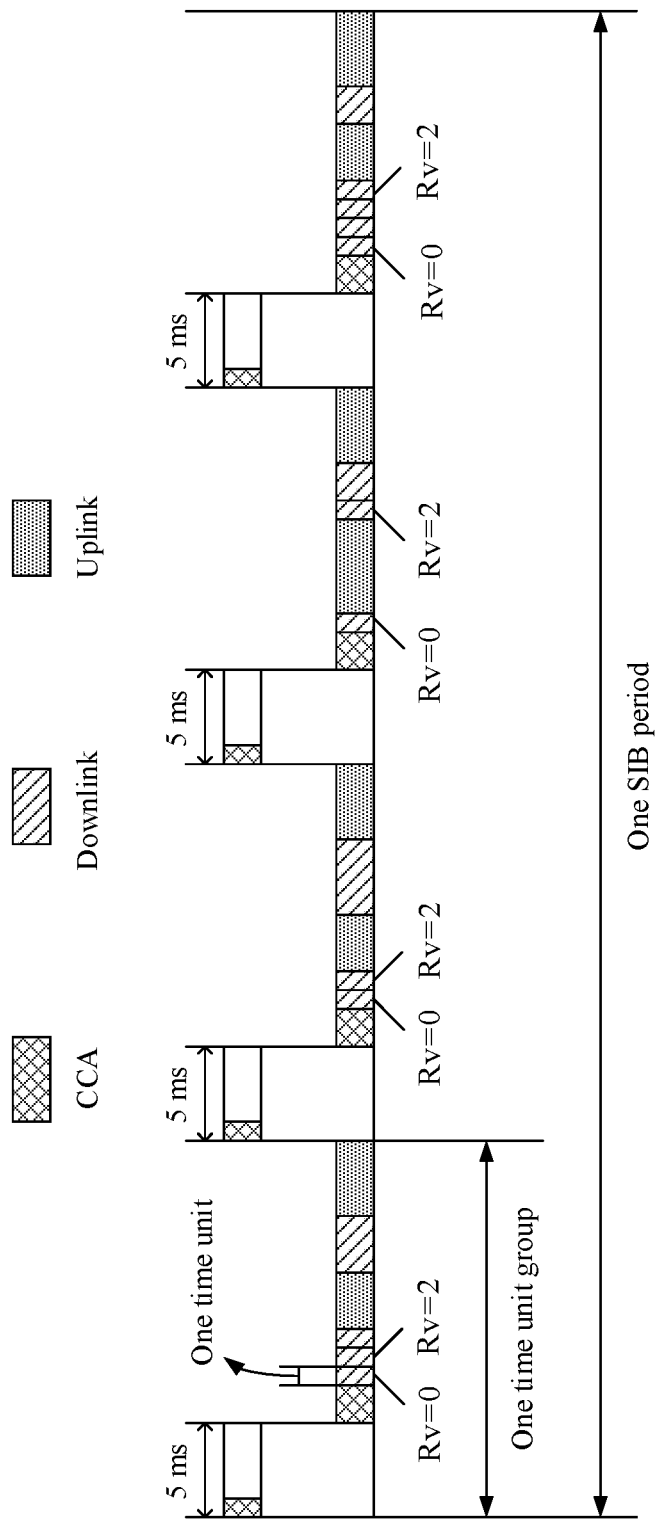
FIG. 9 is a first schematic diagram of redundancy version numbers of the SIB sent in all SIB sending time units sequentially in one SIB period according to an embodiment of the present invention.

For example, if a SIB period T1 is 320 ms, a time length T2 of one time unit group is 80 ms, and a preset quantity M of times for sending the SIB in the SIB period is 8. That is, one SIB includes four time unit groups, the four time unit groups are all candidate SIB sending time unit groups, and a quantity of candidate SIB sending time units in each candidate SIB sending time unit group is 2. If a CCA succeeds in the four candidate SIB sending time unit groups, with reference to Table 2, redundancy version numbers corresponding to the SIB sent by the access network device eight times sequentially in the SIB period are 0, 2, 0, 2, 0, 2, 0, 2. FIG. 9 is a schematic diagram of redundancy version numbers of the SIB sent in all SIB sending time units sequentially in one SIB period.

A2: If a CCA succeeds in a current candidate SIB sending time unit group, and a CCA succeeds in a previous candidate SIB sending time unit group adjacent to the current sending time unit group, a redundancy version number Rv of the SIB sent in an $m^{th}$ SIB sending time unit in the current candidate SIB sending time unit group satisfies $$Rv = \left\lceil \frac{3}{2} \times k \right\rceil \% 4.$$

k=k=[(n−1)×r+m] % 4, 0<m≤r, n indicates that the current candidate SIB sending time unit group is an $n^{th}$ time unit group in consecutive time unit groups in which a CCA succeeds in the candidate SIB sending time unit groups, m and n are positive integers, ⌈ ⌉ represents rounding up, and % represents modulo.

In this embodiment of the present invention, if the CCA succeeds in the current candidate SIB sending time unit group, the current candidate SIB sending time unit group is the SIB sending time unit group, redundancy version numbers of the SIB sent by the access network device in r SIB sending time units in the SIB sending time unit group are related to a previous candidate SIB sending time unit group in which a CCA succeeds. The previous candidate SIB sending time unit group in which the CCA succeeds is a previous candidate SIB sending time unit group adjacent to the current candidate SIB sending time unit group.

Specifically, two consecutive candidate SIB sending time units in which a CCA succeeds are used as an example. The first candidate SIB sending time unit group in which a CCA succeeds is referred to as the first time unit group, and the second candidate SIB sending time unit group in which a CCA succeeds is referred to as the second time unit group. There are r SIB sending time units in each unit group. The access network device may determine, by using the formula in A2, a redundancy version number of the SIB sent in an $m^{th}$ SIB sending time unit in the r SIB sending time units. For example, if r is 2, for the first time unit group (that is, n=1), it is determined, in the first time unit group based on the formula in A2, that a redundancy version number of the SIB sent in the first SIB sending time unit is 0, and a redundancy version number of the SIB sent in the second SIB sending time unit is 2; and for the second time unit group (that is, n=2), it is determined, in the second SIB sending time unit based on the formula in A2, that a redundancy version number of the SIB sent in the first SIB sending time unit is 3, and a redundancy version number of the SIB sent in the second SIB sending time unit is 1. It can be learned that, in the consecutive candidate SIB sending time unit groups in which a CCA succeeds, redundancy version numbers of the SIB that correspond to the SIB sending time units are cyclically distributed in an order of 0, 2, 3, and 1. In other words, when the SIB is sent in the second time unit group, the sending does not need to start from the SIB having the redundancy version number of 0. The access network device sends the SIB corresponding to a next redundancy version number of the redundancy version number of the SIB sent in the last SIB sending time unit in the first time unit group. In this way, transmission of the SIB having the redundancy version number of 0 can be ensured, and a delay in obtaining correct system information by a terminal can be reduced. In addition, a SIB coding gain can be ensured in one SIB period, and demodulation performance of the SIB sent in the SIB period can be improved.

Figure 10:
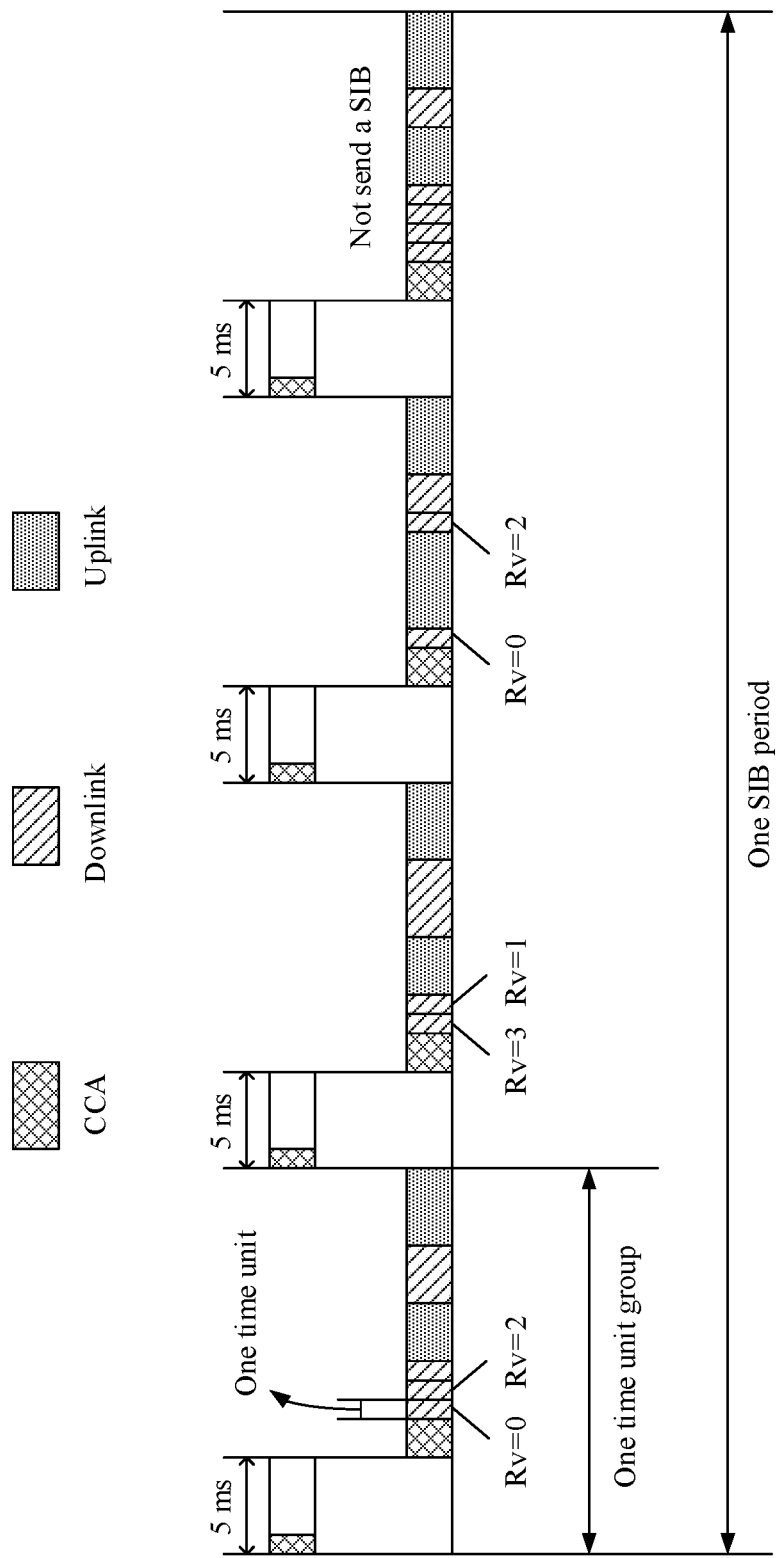
FIG. 10 is a second schematic diagram of redundancy version numbers of the SIB sent in all SIB sending time units sequentially in one SIB period according to an embodiment of the present invention.

For example, if a SIB period T1 is 320 ms, a time length T2 of one time unit group is 80 ms, and a preset quantity M of times for sending the SIB in the SIB period is 8. That is, one SIB includes four time unit groups, the four time unit groups are all candidate SIB sending time unit groups, and a quantity of candidate SIB sending time units in each candidate SIB sending time unit group is 2. If a CCA succeeds in all the first three candidate SIB sending time unit groups, FIG. 10 is a schematic diagram of redundancy version numbers of the SIB sent in all SIB sending time units sequentially in the SIB period.

Optionally, if a CCA succeeds in a current candidate SIB sending time unit group, and a CCA fails in a previous candidate SIB sending time unit group adjacent to the current candidate SIB sending time unit group, a redundancy version number Rv of the SIB sent in an $m^{th}$ SIB sending time unit in the current candidate SIB sending time unit group satisfies $$Rv = \left\lceil \frac{3}{2} \times k \right\rceil \% 4,$$

where k satisfies k=(m−1) % 4, 0<m≤r, m is a positive integer, and % represents modulo.

Figure 11:
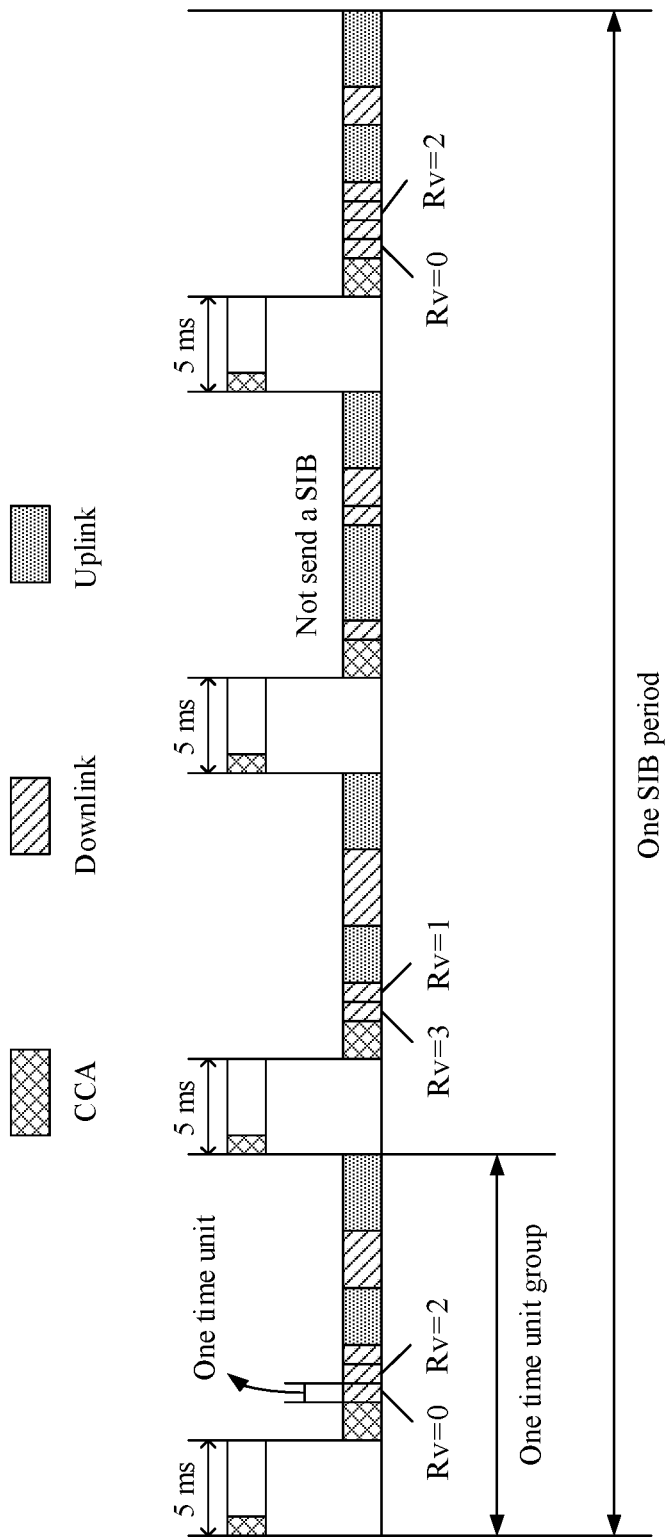
FIG. 11 is a third schematic diagram of redundancy version numbers of the SIB sent in all SIB sending time units sequentially in one SIB period according to an embodiment of the present invention.

For example, if a SIB period T1 is 320 ms, a time length T2 of one time unit group is 80 ms, and a preset quantity M of times for sending the SIB in the SIB period is 8, that is, one SIB includes four time unit groups, the four time unit groups are all candidate SIB sending time unit groups, and a quantity of candidate SIB sending time units in each candidate SIB sending time unit group is 2. If a CCA succeeds in both the first two candidate SIB sending time unit groups, a redundancy version number of the SIB sent in each SIB sending time unit in the first two candidate SIB sending time unit groups may be determined by using the formula in A2. If a CCA fails in the third candidate SIB sending time unit group, no SIB is sent in a time unit in the third candidate SIB sending time unit group. If a CCA succeeds in the fourth candidate SIB sending time unit group, a version number corresponding to the SIB sent in four SIB sending time units in the fourth candidate SIB sending time unit group is determined based on a formula $$Rv = \left\lceil \frac{3}{2} \times k \right\rceil \% 4,$$

where k satisfies k=(m−1) % 4, and 0<m≤r. In addition, a redundancy version number of the SIB sent in the first SIB sending unit in the candidate SIB sending time unit group is 0. In this way, transmission of the SIB having the redundancy version number of 0 can be ensured, and a delay in obtaining correct system information by a terminal can be reduced. FIG. 11 is a schematic diagram of redundancy version numbers of the SIB sent in all SIB sending time units sequentially in the SIB period.

A3: A redundancy version number Rv of the SIB sent in an $m^{th}$ SIB sending time unit in the SIB period satisfies $$Rv = \left\lceil \frac{3}{2} \times k \right\rceil \% 4.$$

k satisfies k=(m−1) % 4, 0<m≤N, and m is a positive integer.

In this embodiment of the present invention, the access network device may send the SIB in N time units in the SIB period. Specifically, a redundancy version number of the SIB sent in an $m^{th}$ time unit (namely, the $m^{th}$ SIB sending time unit) in the N time units may be determined by using the formula in A3.

Figure 12:
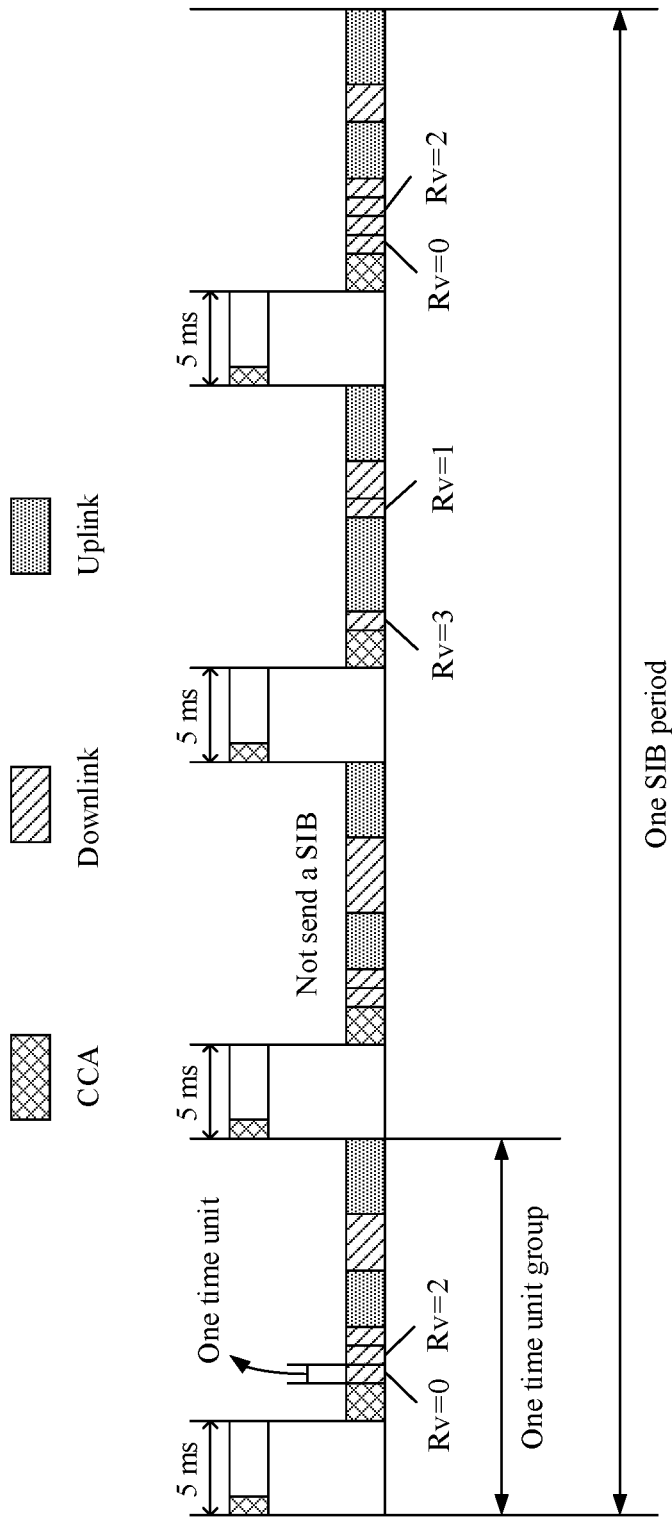
FIG. 12 is a fourth schematic diagram of redundancy version numbers of the SIB sent in all SIB sending time units sequentially in one SIB period according to an embodiment of the present invention.

For example, an example in which a SIB period T1 is 320 ms, a time length T2 of one time unit group is 80 ms, and a preset quantity M of times for sending a SIB in the SIB period is 8 is still used. The SIB includes four time unit groups, the four time unit groups are all candidate SIB sending time unit groups, and a quantity of candidate SIB sending time units in each candidate SIB sending time unit group is 2. It is assumed that in the four time unit groups, a CCA succeeds in the first time unit group, a CCA fails in the second time unit group, a CCA succeeds in the third time unit group, and a CCA succeeds in the fourth time unit group. In this case, in the SIB period, the access network device may send the SIB in six time units. Specifically, it is determined, by using the formula in A3, that redundancy version numbers of the SIB sent in two SIB sending time units sequentially in the first time unit group are 0 and 2, and no SIB is sent in a time unit in the second time unit group. The access network device determines that redundancy version numbers of the SIB sequentially sent in two SIB sending time units in the third time unit group are 3 and 1. The access network device determines that redundancy version numbers of the SIB sent in two SIB sending time units sequentially in the fourth time unit group are 0 and 2. FIG. 12 is a schematic diagram of redundancy version numbers of the SIB sent in all SIB sending time units sequentially in the SIB period.

It can be learned from the foregoing description that in one SIB period, redundancy version numbers of the SIB sent in the N sending time units sequentially are cyclically distributed in an order of 0, 2, 3, and 1. In other words, it is not limited that a redundancy version number of the SIB sent in the first SIB sending time unit in each SIB sending time unit group of all SIB sending time unit groups is 0, so that transmission of the SIB having the redundancy version number of 0 can be ensured, and a delay in receiving a correct SIB by a terminal device can be reduced. In addition, the access network device and the terminal do not need to determine whether a CCA succeeds in a previous candidate SIB sending time unit group, thereby reducing system complexity. To be specific, provided that the CCA succeeds in the candidate SIB sending time unit group, the SIB is cyclically sent in an entire SIB period in an order of the redundancy version numbers 0, 2, 3, and 1.

In a possible implementation, if the SIB period is less than a time length of one time unit group (that is, T2<T1), a plurality of SIB periods are located in one time unit group. It is assumed that a quantity of times for sending a SIB in one SIB period is M. In this case, a redundancy version number of an SIB sent in an $m^{th}$ SIB sending time unit in each SIB period satisfies $$Rv = \left\lceil \frac{3}{2} \times k \right\rceil \% 4,$$

where k satisfies k=(m−1) % 4, 0<m≤M, and m is a positive integer.

For example, if one SIB period is 40 ms, and a time length of one time unit group is 80 ms. That is, the time unit group includes two SIB periods, and a preset quantity of times for sending a SIB in the SIB period is 2. In this case, the access network device sends the SIB for four times in the time unit group. If the access network device determines that a CCA succeeds in the current time unit group, in the candidate SIB sending time unit group determined by the access network device, a redundancy version number of the SIB sent in the first SIB sending time unit is 0, a redundancy version number of the SIB sent in the second SIB sending time unit is 2, a redundancy version number of the SIB sent in the third SIB sending time unit is 0, and a redundancy version number of the SIB sent in the fourth SIB sending time unit is 2. It can be learned that the redundancy version numbers of the SIB sent by the access network device twice in the first SIB period are 0 and 2, the redundancy version numbers of the SIB sent by the access network device twice in the second SIB period are 0 and 2, and the redundancy version numbers of the SIB in the two SIB periods are not associated. In addition, because one time unit group includes two SIB periods, the access network device performs only one CCA in the two SIB periods. To be specific, if a CCA corresponding to the first SIB period succeeds, the SIB is directly sent in the second SIB period.

It should be noted that, in this embodiment of the present invention, the r candidate SIB sending time units in one candidate SIB sending time unit group may be r consecutive time units in the candidate SIB sending time unit group, or may be r inconsecutive time point units, and in the r time units, the first time unit may be the first time unit (for example, a first downlink subframe) that can be used to send downlink data in the candidate SIB sending time unit group, or may be another time unit used to send the downlink data. This may be specifically determined based on an actual use requirement, and this is not specifically limited in this embodiment of the present invention.

S204: The access network device sends the SIB to the terminal device in the N sending time units based on the redundancy version number of the SIB.

In this embodiment of the present invention, after the access network device determines, in S203, the redundancy version number of the SIB sent in the N sending time units, the access network device may send, in the N sending time units based on the redundancy version number of the SIB, the SIB corresponding to the redundancy version number to the terminal device.

S103: The terminal device receives the SIB in the N time units in the SIB period, where a redundancy version number of the SIB information received in the first time unit in the N time units is 0.

One SIB period includes T time unit groups, and the T time unit groups include $T_P$ candidate SIB receiving time unit groups, where $T_P \leq T$; one time unit group includes a time units used for a clear channel assessment CCA; and one time unit group in the $T_P$ time unit groups includes r candidate SIB receiving time units, where N is a total quantity of candidate SIB receiving time units included in a time unit group in which a CCA succeeds in the $T_P$ candidate SIB receiving time unit groups in the SIB period, $N \leq T_P \times r$, and T is a positive integer.

Optionally, in each candidate SIB receiving time unit group in the SIB period, a redundancy version number of the SIB received in the first SIB receiving time unit is 0.

In an optional implementation, a redundancy version number Rv of the SIB received in an $m^{th}$ SIB receiving time unit in one candidate SIB receiving time unit group in the SIB period satisfies $$Rv = \left\lceil \frac{3}{2} \times k \right\rceil \% 4,$$

where k satisfies k=(m−1) % 4, 0<m≤r, m is a positive integer, ⌈ ⌉ represents rounding up, and % represents modulo.

In another optional implementation, if a CCA succeeds in a current candidate SIB receiving time unit group, and a CCA succeeds in a previous candidate SIB receiving time unit group adjacent to the current candidate SIB receiving time unit group, a redundancy version number Rv of the SIB received in an $m^{th}$ SIB sending time unit in the current candidate SIB receiving time unit group satisfies $$Rv = \left\lceil \frac{3}{2} \times k \right\rceil \% 4,$$

where k satisfies k=[(n−1)×r+m] % 4, 0<m≤r, n indicates that the current candidate SIB receiving time unit group is an $n^{th}$ time unit group in consecutive time unit groups in which a CCA succeeds in the candidate SIB receiving time unit groups, m and n are positive integers, ⌈ ⌉ represents rounding up, and % represents modulo.

If a CCA succeeds in a current candidate SIB receiving time unit group, and a CCA fails in a previous candidate SIB receiving time unit group adjacent to the current candidate SIB receiving time unit group, a redundancy version number Rv of the SIB received in an $m^{th}$ SIB sending time unit in the current candidate SIB sending time unit group satisfies $$Rv = \left\lceil \frac{3}{2} \times k \right\rceil \% 4,$$

where k satisfies k=(m−1) % 4, 0<m≤r, m is a positive integer, ⌈ ⌉ represents rounding up, and % represents modulo.

In another optional implementation, a redundancy version number Rv of the SIB sent in an $m^{th}$ SIB sending time unit in the SIB period satisfies $$Rv = \left\lceil \frac{3}{2} \times k \right\rceil \% 4,$$

where k satisfies k=(m−1) % 4, 0<m≤N, and m is a positive integer.

It should be noted that the access network device sends the SIB in one time unit, and the terminal device receives the SIB in the same time unit. In this way, in this embodiment of the present invention, the candidate SIB sending time unit group and the candidate SIB receiving time unit group are a same time unit group. The time unit group is referred to as the candidate SIB sending time unit group for the access network device, and the time unit group is referred to as the candidate SIB receiving time unit group for the terminal device. Similarly, the SIB sending time unit group and the SIB receiving time unit group are a same time unit group, the candidate SIB sending time unit and the candidate SIB receiving time unit are a same time unit, and the SIB sending time unit and the SIB receiving time unit are a same time unit.

In this embodiment of the present invention, in one SIB period, after determining the redundancy version number of the SIB sent by the access network device, the access network device sends the SIB corresponding to the redundancy version number to the terminal device in the N time units. In this way, the terminal device receives, in the N time units, the SIB corresponding to the redundancy version number.

For specific descriptions of the redundancy version number of the SIB received by the terminal device in S103, refer to related descriptions of the redundancy version number of the SIB sent by the access network device in the foregoing embodiment. Details are not described herein again.

S104: The terminal device parses the SIB received in the N time units in the SIB period.

In this embodiment of the present invention, after the terminal device receives the SIB corresponding to different redundancy version numbers in the N time units, the terminal device parses the SIB corresponding to the different redundancy version numbers, to obtain a source SIB. Because a redundancy version number of the SIB received by the terminal device in the first time unit in the N time units is 0, the access network device can more accurately parse the SIB based on the SIB having the redundancy version number of 0.

According to the method for transmitting system information provided in this embodiment of the present invention, after the access network device generates the SIB, the access network device may send the SIB to the terminal device in the N time units in the SIB period, and a redundancy version number of the SIB sent in the first time unit in the N time units is 0. After the terminal device receives the SIB in the N time units, the terminal device may parse the SIB received in the N time units. A redundancy version number of the SIB sent by the access network device in the first time unit in the N time units in the SIB period is 0. Therefore, in a process in which the terminal device receives the SIB, even if a first CCA fails in the current SIB period, the terminal device may still obtain the SIB having the redundancy version number of 0 in the current SIB period. In addition, the SIB having the redundancy version number of 0 includes a relatively large quantity of information bits, and has relatively good demodulation performance in a same channel environment. Therefore, the terminal can obtain a correct SIB at a higher probability by parsing the SIB. In this way, a delay in obtaining correct system information by the terminal device can be reduced.

The foregoing mainly describes the solutions provided in the embodiments of the present invention from a perspective of interaction between network elements. It may be understood that, to implement the foregoing functions, each network element, such as an access network device or a terminal device, includes a hardware structure and/or a software module corresponding to each function. A person of ordinary skill in the art should easily be aware that, in combination with units and algorithm steps in the examples described in the embodiments disclosed in this specification, the embodiments of the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, function modules may be divided in the access network device, the terminal device, and the like based on the foregoing method example. For example, the function modules may be obtained through division based on corresponding functions, or two or more functions may be integrated into one processing module. The integrated module may be implemented in a form of hardware, or may be implemented in a form of a software function module. It should be noted that, in the embodiments of the present invention, module division is an example, and is merely a logical function division. During actual implementation, another division manner may be used.

Figure 13:
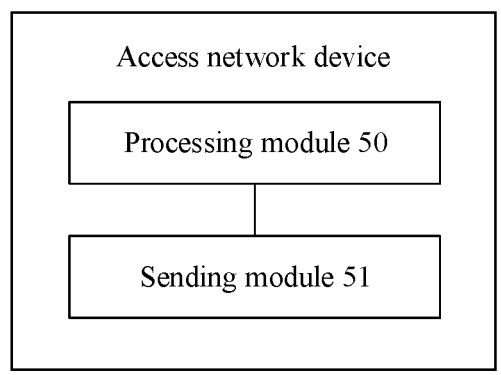
FIG. 13 is a first schematic structural diagram of an access network device according to an embodiment of the present invention.

When the function modules are obtained through division in correspondence to the functions, FIG. 13 is a possible schematic structural diagram of the access network device in the foregoing embodiments. As shown in FIG. 13, the access network device may include a processing module 50 and a sending module 51. The processing module 50 may be configured to support the access network device in performing S101 in the foregoing method embodiment. The sending module 51 may be configured to support the access network device in performing S102 and S204 in the foregoing method embodiment. All related content of the steps in the foregoing method embodiment may be cited in function descriptions of corresponding function modules. Details are not described herein again.

Figure 14:
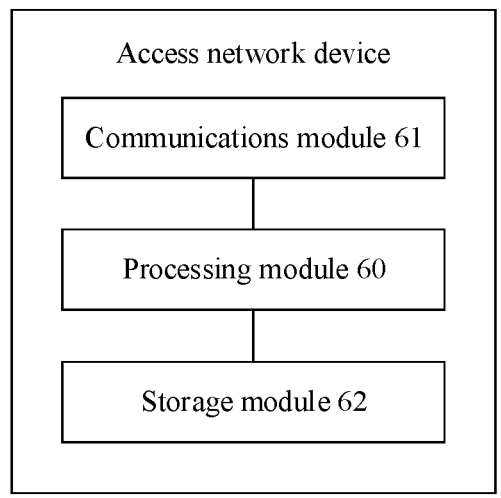
FIG. 14 is a second schematic structural diagram of an access network device according to an embodiment of the present invention.

When an integrated unit is used, FIG. 14 is a possible schematic structural diagram of the access network device in the foregoing embodiments. As shown in FIG. 14, the access network device may include a processing module 60 and a communications module 61. The processing module 60 may be configured to control and manage an action of the access network device. For example, the processing module 60 may be configured to support the access network device in performing S103 and S201 to S203 in the foregoing method embodiment, and/or may be configured for another process of the technology described in this specification. The communications module 61 may be configured to support the access network device in communicating with another network entity. For example, the communications module 61 may be configured to support the access network device in performing S103 and S201 in the foregoing method embodiment. Optionally, as shown in FIG. 14, the access network device may further include a storage module 62, configured to store program code and data of the access network device.

The processing module 60 may be a processor or a controller (for example, may be the processor in 31 shown in FIG. 3). For example, the processing module 60 may be a central processing unit (central processing unit, CPU), a general processor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or any combination thereof. The processor may implement or execute various example logical blocks, modules, and circuits described with reference to content disclosed in the embodiments of the present invention. The processor may be a combination of processors implementing a computing function, for example, a combination of one or more microprocessors, or a combination of a DSP and a microprocessor. The communications module 61 may be a transceiver, a transceiver circuit, a communications interface, or the like (for example, may be the radio frequency unit in 30 shown in FIG. 3). The storage module 62 may be a memory (for example, may be the memory in 31 shown in FIG. 3).

When the processing module 60 is a processor, the communications module 61 is a transceiver, and the storage module 62 is a memory, the processor, the transceiver, and the memory may be connected by using a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

Figure 15:
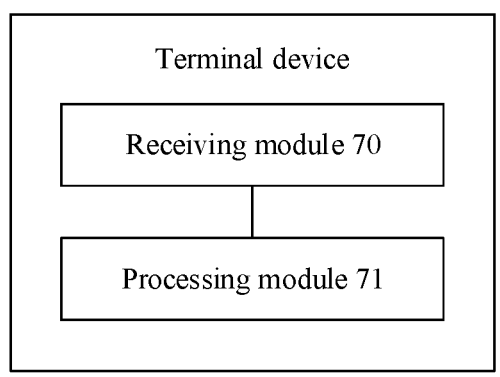
FIG. 15 is a first schematic structural diagram of a terminal device according to an embodiment of the present invention.

When the function modules are obtained through division in correspondence to the functions, FIG. 15 is a possible schematic structural diagram of the terminal device in the foregoing embodiments. As shown in FIG. 15, the terminal device may include a receiving module 70 and a processing module 71. The receiving module 70 may be configured to support the terminal device in performing S103 in the foregoing method embodiment. The processing module 71 may be configured to support the terminal device in performing S104 in the foregoing method embodiment. All related content of the steps in the foregoing method embodiment may be cited in function descriptions of corresponding function modules. Details are not described herein again.

Figure 16:
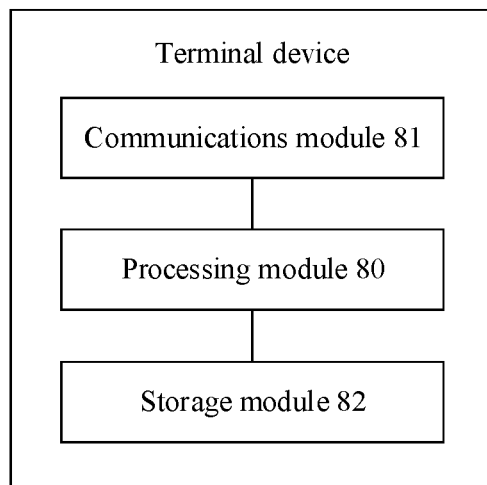
FIG. 16 is a second schematic structural diagram of a terminal device according to an embodiment of the present invention.

When an integrated unit is used, FIG. 16 is a possible schematic structural diagram of the terminal device in the foregoing embodiments. As shown in FIG. 16, the terminal device may include a processing module 80 and a communications module 81. The processing module 80 may be configured to perform control management on an action of the access network device. For example, the processing module 80 may be configured to support the terminal device in performing S104 in the foregoing method embodiment, and/or may be configured for another process of the technology described in this specification. The communications module 81 may be configured to support the terminal device in communicating with another network entity. For example, the communications module 81 may be configured to support the terminal device in performing S103 in the foregoing method embodiment. Optionally, as shown in FIG. 16, the terminal device may further include a storage module 82, configured to store program code and data of the terminal device.

The processing module 80 may be a processor or a controller (for example, may be the processor 40 shown in FIG. 4), and for example, may be a CPU, a general purpose processor, a DSP, an ASIC, an FPGA or another programmable logic device, a transistor logic device, a hardware component, or any combination thereof. The processor may implement or execute various example logical blocks, modules, and circuits described with reference to content disclosed in the embodiments of the present invention. The processor may be a combination of processors implementing a computing function, for example, a combination of one or more microprocessors, or a combination of a DSP and a microprocessor. The communications module 81 may be a transceiver, a transceiver circuit, a communications interface, or the like (for example, may be the radio frequency unit 41 shown in FIG. 4). The storage module 82 may be a memory (for example, may be the memory 43 shown in FIG. 4).

When the processing module 80 is a processor, the communications module 81 is a transceiver, and the storage module 82 is a memory, the processor, the transceiver, and the memory may be connected by using a bus. The bus may be a PCI bus, an EISA bus, or the like. The bus may be classified into an address bus, a data bus, a control bus, and the like.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (digital video disc, DVD)), a semiconductor medium (for example, a solid-state drive (solid state drives, SSD)), or the like.

According to the foregoing descriptions of the implementations, a person skilled in the art may be clearly understand that, for the purpose of convenient and brief description, only division of the foregoing function modules is used as an example for illustration. During actual application, the foregoing functions can be allocated to different function modules and implemented based on a requirement, that is, an inner structure of an apparatus is divided into different function modules to implement all or some of the functions described above. For a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for transmitting system information, comprising:
    generating a system information block (SIB); and
    sending the SIB in N time units of a SIB period, wherein a first time unit of the N time units includes a redundancy version number of the SIB that is set to 0, the redundancy version number indicates a location in a buffer from which data to be transmitted is read, the SIB period comprises T time unit groups, and the T time unit groups comprise $T_P$ SIB candidate sending time unit groups, wherein $T_P \le T$, each of the T time unit groups comprises a plurality of time units for a clear channel assessment (CCA), and each of the $T_P$ SIB candidate sending time unit groups comprises r SIB candidate sending time units, and wherein N is a total quantity of SIB candidate sending time units comprised in one or more of the $T_P$ SIB candidate sending time unit groups that the CCA is successful, and $N \le T_P \times r$.

2. The method according to claim 1, wherein a redundancy version number of the SIB sent in a first SIB sending time unit in each SIB candidate sending time unit group in the SIB period is 0.

3. The method according to claim 1, wherein a redundancy version number Rv of the SIB sent in an $m^{th}$ SIB sending time unit in a SIB candidate sending time unit group in the SIB period satisfies $$Rv = \left\lceil \frac{3}{2} \times k \right\rceil \%4,$$

wherein k satisfies k=(m−1) %4, 0<m≤r, m is a positive integer, $\lceil \ \rceil$ represents a rounding up operation, and % represents a modulo operation.

4. The method according to claim 1, wherein
when a CCA succeeds in a current SIB candidate sending time unit group and a SIB candidate sending time unit group immediately preceding the current SIB candidate sending time unit group, a redundancy version number Rv of the SIB sent in an $m^{th}$ SIB sending time unit in the current SIB candidate sending time unit group satisfies $$Rv = \left\lceil \frac{3}{2} \times k \right\rceil \%4,$$

wherein k satisfies k=[(n−1)×r+m]%4, 0<m≤r, where n indicates that the current SIB candidate sending time unit group is an $n^{th}$ time unit group in consecutive time unit groups of the $T_P$ SIB candidate sending time unit groups that the CCA is successful, m and n are positive integers, $\lceil \ \rceil$ represents a rounding up operation, and % represents a modulo operation.

5. The method according to claim 1, wherein
when the CCA is successful in a current SIB candidate sending time unit group, and the CCA fails in a SIB candidate sending time unit group immediately preceding the current SIB candidate sending time unit group, a redundancy version number Rv of the SIB sent in an $m^{th}$ SIB sending time unit in the current SIB candidate sending time unit group satisfies $$Rv = \left\lceil \frac{3}{2} \times k \right\rceil \%4,$$

wherein k satisfies k=(m−1)%4, 0<m≤r, m is a positive integer, $\lceil \ \rceil$ represents a rounding up operation, and % represents a modulo operation.

6. A method for receiving system information, comprising:
    receiving a system information block (SIB) in N time units of a SIB period, wherein a first time unit of the N time units includes a redundancy version number of the SIB that is set to 0, the redundancy version number indicates a location in a buffer from which data to be transmitted is read, the SIB period comprises T time unit groups, and the T time unit groups comprise $T_P$ SIB candidate receiving time unit groups, wherein $T_P \le T$, each of the T time unit groups comprises a plurality of time units for a clear channel assessment (CCA), and each of the $T_P$ SIB candidate sending time unit groups comprises r SIB candidate receiving time units, and wherein N is a total quantity of SIB candidate receiving time units comprised in one or more of the $T_P$ SIB candidate receiving time unit groups that the CCA is successful, and $N \le T_P \times r$; and
    parsing the SIB received in the N time units in the SIB period.

7. The method according to claim 6, wherein a redundancy version number of the SIB received in a first SIB receiving time unit in each SIB candidate receiving time unit group in the SIB period is 0.

8. The method according to claim 6, wherein a redundancy version number Rv of the SIB received in an $m^{th}$ SIB receiving time unit in a SIB candidate receiving time unit group in the SIB period satisfies $$Rv = \left\lceil \frac{3}{2} \times k \right\rceil \%4,$$

wherein k satisfies k=(m−1)%4, 0<m≤r, is a positive integer, ⌉ ⌈ represents a rounding up operation, and % represents a modulo operation.

9. The method according to claim 6, wherein
when a CCA succeeds in a current SIB candidate receiving time unit group and a SIB candidate receiving time unit group immediately preceding the current SIB candidate receiving time unit group, a redundancy version number Rv of the SIB received in an $m^{th}$ SIB sending time unit in the current SIB candidate receiving time unit group satisfies $$Rv = \left\lceil \frac{3}{2} \times k \right\rceil \%4,$$

wherein k satisfies k=[(n−1)×r+m]%4, 0<m≤r, where n indicates that the current SIB candidate receiving time unit group is an $n^{th}$ time unit group in consecutive time unit groups of the $T_P$ SIB candidate receiving time unit groups that the CCA is successful, m and n are positive integers, ⌉ ⌈ represents a rounding up operation, and % represents a modulo operation.

10. The method according to claim 6, wherein
when the CCA is successful in a current SIB candidate receiving time unit group, and the CCA fails in a SIB candidate receiving time unit group immediately preceding the current SIB candidate receiving time unit group, a redundancy version number Rv of the SIB received in an $m^{th}$ SIB sending time unit in the current SIB candidate sending time unit group satisfies $$Rv = \left\lceil \frac{3}{2} \times k \right\rceil \%4,$$

wherein k satisfies k=(m−1)%4, 0<m≤r, ⌉ ⌈ represents a rounding up operation, and % represents a modulo operation.

11. A communications apparatus, comprising at least one processor, a transceiver, and a non-transitory computer-readable storage medium coupled to the at least one processor and storing programming instructions for execution by the at least one processor, the programming instructions instruct the at least one processor to:
generate a system information block (SIB); and
cause the transceiver to send, in N time units of a SIB period, the SIB generated by the processor, wherein a first time unit of the N time units includes a redundancy version number of the SIB that is set to 0, the redundancy version number indicates a location in a buffer from which data to be transmitted is read, the SIB period comprises T time unit groups, and the T time unit groups comprise $T_P$ SIB candidate sending time unit groups, wherein $T_P \le T$, each of the T time unit groups comprises a plurality of time units for a clear channel assessment (CCA), and each of the $T_P$ SIB candidate sending time unit groups comprises r SIB candidate sending time units, and wherein N is a total quantity of SIB candidate sending time units comprised in one or more of the $T_P$ SIB candidate sending time unit groups that the CCA is successful, and $N \le T_P \times r$.

12. The communications apparatus according to claim 11, wherein
a redundancy version number of the SIB sent in a first SIB sending time unit in each SIB candidate sending time unit group in the SIB period is 0.

13. The communications apparatus according to claim 11, wherein
a redundancy version number Rv of the SIB sent in an $m^{th}$ SIB sending time unit in a SIB candidate sending time unit group in the SIB period satisfies $$Rv = \left\lceil \frac{3}{2} \times k \right\rceil \%4,$$

wherein k satisfies k=(m−1)%4, 0<m≤r, m is a positive integer, ⌉ ⌈ represents a rounding up operation, and % represents a modulo operation.

14. The communications apparatus according to claim 11, wherein
when a CCA succeeds in a current SIB candidate sending time unit group, and a CCA succeeds in a previous SIB candidate sending time unit group immediately preceding the current SIB candidate sending time unit group, a redundancy version number Rv of the SIB sent in an $m^{th}$ SIB sending time unit in the current SIB candidate sending time unit group satisfies $$Rv = \left\lceil \frac{3}{2} \times k \right\rceil \%4,$$

wherein k satisfies k=[(n−1)×r+m]%4, 0<m≤r, where n indicates that the current SIB candidate sending time unit group is an $n^th$ time unit group in consecutive time unit groups of the $T_P$ SIB candidate sending time unit groups that the CCA is successful, m and n are positive integers, ⌉ ⌈ represents a rounding up operation, and % represents a modulo operation.

15. The communications apparatus according to claim 11, wherein
when the CCA is successful in a current SIB candidate sending time unit group, and the CCA fails in a SIB candidate sending time unit group immediately preceding the current SIB candidate sending time unit group, a redundancy version number Rv of the SIB sent in an $m^{th}$ SIB sending time unit in the current SIB candidate sending time unit group satisfies $$Rv = \left\lceil \frac{3}{2} \times k \right\rceil \%4,$$

wherein k satisfies k=(m−1)%4, 0<m≤r, m is a positive integer, ⌉ ⌈ represents a rounding up operation, and % represents a modulo operation.

16. A communications apparatus, comprising a transceiver, at least one processor, and a non-transitory computer-readable storage medium coupled to the at least one processor and storing programming instructions for execution by the at least one processor, the programming instructions instruct the at least one processor to:
cause the transceiver to receive a system information block (SIB) in N time units of a SIB period, wherein a first time unit of the N time units includes a redundancy version number of the SIB that is set to 0, the redundancy version number indicates a location in a buffer from which data to be transmitted is read, the SIB period comprises T time unit groups, and the T time unit groups comprise $T_P$ SIB candidate receiving time unit groups, wherein $T_P \leq T$, each of the T time unit groups comprises a plurality of time units for a clear channel assessment (CCA), and each of the $T_P$ SIB candidate sending time unit groups comprises r SIB candidate receiving time units, and wherein N is a total quantity of SIB candidate receiving time units comprised in one or more of the $T_P$ SIB candidate receiving time unit groups that the CCA is successful, and $N \leq T_P \times r$; and parse the SIB received in the N time units in the SIB period.

17. The communications apparatus according to claim 16, wherein
a redundancy version number of the SIB received in a first SIB receiving time unit in each SIB candidate receiving time unit group in the SIB period is 0.

18. The communications apparatus according to claim 16, wherein
a redundancy version number Rv of the SIB received in an $m^{th}$ SIB receiving time unit in a SIB candidate receiving time unit group in the SIB period satisfies $$Rv = \left\lceil \frac{3}{2} \times k \right\rceil \%4,$$

wherein k satisfies k=(m−1)%4, 0<m≤r, m is a positive integer, represents a rounding up operation, and % represents a modulo operation.

19. The communications apparatus according to claim 16, wherein
when a CCA succeeds in a current SIB candidate receiving time unit group, and a CCA succeeds in a previous SIB candidate receiving time unit group immediately preceding the current SIB candidate receiving time unit group, a redundancy version number Rv of the SIB received in an $m^{th}$ SIB sending time unit in the current SIB candidate receiving time unit group satisfies F3

$$Rv = \left\lceil \frac{3}{2} \times k \right\rceil \%4,$$

wherein k satisfies k=[(n−1)×r+m]%4, 0<m≤r, where n indicates that the current SIB candidate receiving time unit group is an $n^{th}$ time unit group in consecutive time unit groups of the $T_P$ SIB candidate receiving time unit groups that the CCA is successful, m and n are positive integers, ⌉ ⌈ represents a rounding up operation, and % represents a modulo operation.

20. The communications apparatus according to claim 16, wherein
when the CCA is successful in a current SIB candidate receiving time unit group, and the CCA fails in a SIB candidate receiving time unit group immediately preceding the current SIB candidate receiving time unit group, a redundancy version number Rv of the SIB received in an $m^{th}$ SIB sending time unit in the current SIB candidate sending time unit group satisfies $$Rv = \left\lceil \frac{3}{2} \times k \right\rceil \%4,$$

wherein k satisfies k=(m−1)%4, 0<m≤r, m is a positive integer, ⌉ ⌈ represents a rounding up operation, and % represents a modulo operation.

* * * * *

UNITED STATES PATENT AND TRADEMARK OFFICE
CERTIFICATE OF CORRECTION

PATENT NO. : 11,382,024 B2
APPLICATION NO. : 16/925709
DATED : July 5, 2022
INVENTOR(S) : Zhenyu Li et al.

It is certified that error appears in the above-identified patent and that said Letters Patent is hereby corrected as shown below:

In the Claims

On Column 29 Line 65, In Claim 3, delete "(m-1) %4," and insert -- (m-1)%4, --.

On Column 31 Line 1, In Claim 8, delete "is" and insert -- m is --.

On Column 32 Line 35, In Claim 14, delete "$n^t h$" and insert -- $n^{th}$ --.

On Column 33 Line 31 (Approx.), In Claim 18, delete "represents" and insert -- ⌈ ⌉ represents --.

On Column 34 Line 5, In Claim 19, delete "satisfies F3" and insert -- satisfies --.

Signed and Sealed this
Fifteenth Day of November, 2022

Katherine Kelly Vidal
*Director of the United States Patent and Trademark Office*